US010440499B2

(12) United States Patent
Farrell

(10) Patent No.: US 10,440,499 B2
(45) Date of Patent: Oct. 8, 2019

(54) USER LOCATION AND IDENTITY AWARENESS

(71) Applicant: Comcast Cable Communications, LLC, Philadelphia, PA (US)

(72) Inventor: Corey Farrell, Lansdowne, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/305,702

(22) Filed: Jun. 16, 2014

(65) Prior Publication Data
US 2015/0365787 A1    Dec. 17, 2015

(51) Int. Cl.
*H04W 24/00* (2009.01)
*H04W 4/02* (2018.01)
*H04W 4/08* (2009.01)

(52) U.S. Cl.
CPC .............. *H04W 4/02* (2013.01); *H04W 4/08* (2013.01)

(58) Field of Classification Search
CPC ......... H04W 24/00; H04W 4/02; H04W 4/08; H04M 11/04; H04B 7/15; H04L 67/306; H04L 29/06; H04L 63/00; H04L 12/24; G06Q 50/00; G06Q 30/02; G06Q 10/10; G06Q 30/0631; G06Q 50/01; H04N 7/16
USPC ........... 455/456.1–456.6, 457, 420; 709/221; 725/25
See application file for complete search history.

(56) References Cited

U.S. PATENT DOCUMENTS 5,828,945 A    10/1998 Klosterman
6,493,878 B1 *  12/2002 Kassatly ............... H04N 7/08
                                                    348/E7.024
6,526,577 B1    2/2003 Knudson et al.
7,221,961 B1    5/2007 Fukumoto et al.
7,502,619 B1 *  3/2009 Katz ..................... G01S 5/02
                                                    340/531
7,921,071 B2 *  4/2011 Hicks .................... G06N 5/02
                                                    706/52
8,316,088 B2 * 11/2012 Jalava .................. G06Q 10/10
                                                    370/255

(Continued)

OTHER PUBLICATIONS

U.S. Appl. No. 14/456,601, Merging Permissions and Content Access, filed Aug. 11, 2014.

(Continued)

*Primary Examiner* — Mahendra R Patel
(74) *Attorney, Agent, or Firm* — Banner & Witcoff, Ltd.

(57) ABSTRACT

Systems and methods for performing actions based on a user's location are described. A user profile correlating automated actions with locations may be generated and/or stored. The user's location may be determined by determining the location of a device, such as the user's mobile device. Several different wireless communication protocols and/or wireless networks (e.g., Bluetooth, Wi-Fi, Cellular, and/or GPS) may be used in a hierarchical manner to determine the user's location. When the user's location is determined, one or more actions may be performed based on the user's location and/or profile. For example, an instruction may be sent to a display device or set-top box located in the same room as the user to turn on the display device or set-top box or to display a content recommendation for the user. As another example, an instruction may be sent to the user's home to deactivate a home security system when the user is within a predetermined distance from the home.

23 Claims, 11 Drawing Sheets

(56) References Cited

U.S. PATENT DOCUMENTS

| | | | |
|---|---|---|---|
| 8,385,942 B1* | 2/2013 | Leung | H04W 24/08 455/418 |
| 8,463,295 B1* | 6/2013 | Caralis | G06Q 30/0631 455/456.3 |
| 8,522,294 B2* | 8/2013 | Salinger | H04N 21/6118 725/105 |
| 8,588,198 B2* | 11/2013 | Salinger | H04W 4/06 370/341 |
| 8,677,502 B2* | 3/2014 | Hanson | G06F 17/30265 709/217 |
| 8,705,639 B2* | 4/2014 | Salinger | H04N 19/80 375/259 |
| 9,084,003 B1 | 7/2015 | Sanio et al. | |
| 10,045,090 B2 | 8/2018 | Kareeson et al. | |
| 2002/0162121 A1 | 10/2002 | Mitchell | |
| 2003/0188316 A1 | 10/2003 | DePrez | |
| 2004/0068744 A1 | 4/2004 | Claussen et al. | |
| 2004/0117269 A1 | 6/2004 | Karaoguz et al. | |
| 2004/0203374 A1 | 10/2004 | Zilliacus | |
| 2005/0066353 A1 | 3/2005 | Fransdonk | |
| 2005/0097595 A1 | 5/2005 | Lipsanen et al. | |
| 2005/0130585 A1 | 6/2005 | Gnuschke et al. | |
| 2005/0232242 A1 | 10/2005 | Karaoguz et al. | |
| 2005/0277428 A1* | 12/2005 | Nathan Brown | H04M 1/72577 455/456.3 |
| 2006/0025069 A1 | 2/2006 | Benco et al. | |
| 2006/0046709 A1 | 3/2006 | Krumm et al. | |
| 2006/0080716 A1 | 4/2006 | Nishikawa et al. | |
| 2006/0136496 A1 | 6/2006 | Ohashi | |
| 2007/0124789 A1 | 5/2007 | Sachson et al. | |
| 2007/0299778 A1 | 12/2007 | Haveson et al. | |
| 2008/0077956 A1 | 3/2008 | Morrison et al. | |
| 2008/0109307 A1 | 5/2008 | Ullah | |
| 2008/0115166 A1 | 5/2008 | Bhogal et al. | |
| 2008/0134043 A1 | 6/2008 | Georgis et al. | |
| 2009/0017750 A1 | 1/2009 | Marcinkiewicz | |
| 2009/0125971 A1 | 5/2009 | Belz et al. | |
| 2009/0144629 A1 | 6/2009 | Ferlitsch et al. | |
| 2009/0165045 A1 | 6/2009 | Stallings et al. | |
| 2009/0216630 A1 | 8/2009 | Carnahan | |
| 2009/0265737 A1 | 10/2009 | Issa et al. | |
| 2009/0265742 A1 | 10/2009 | Schwartz et al. | |
| 2009/0293095 A1 | 11/2009 | Karaoguz et al. | |
| 2010/0011103 A1 | 1/2010 | Luzzatti et al. | |
| 2010/0107185 A1* | 4/2010 | Shintani | H04N 21/4126 725/25 |
| 2010/0115592 A1 | 5/2010 | Belz et al. | |
| 2010/0199295 A1 | 8/2010 | Katpelly et al. | |
| 2010/0268955 A1 | 10/2010 | Ohno et al. | |
| 2010/0306394 A1 | 12/2010 | Brown | |
| 2010/0325652 A1 | 12/2010 | Lee et al. | |
| 2011/0069940 A1 | 3/2011 | Shimy et al. | |
| 2011/0113122 A1* | 5/2011 | Drope | G06F 21/10 709/219 |
| 2011/0126251 A1* | 5/2011 | LaFreniere | H04N 7/17327 725/110 |
| 2011/0126258 A1* | 5/2011 | Emerson | H04L 51/04 725/133 |
| 2011/0292300 A1 | 12/2011 | Nagara et al. | |
| 2012/0011558 A1 | 1/2012 | Maddali et al. | |
| 2012/0054856 A1 | 3/2012 | Johansson | |
| 2012/0060176 A1 | 3/2012 | Chai et al. | |
| 2012/0064923 A1* | 3/2012 | Imes | F24F 11/0012 455/457 |
| 2012/0117017 A1 | 5/2012 | Phillips et al. | |
| 2012/0208466 A1 | 8/2012 | Park et al. | |
| 2012/0240144 A1 | 9/2012 | Rose | |
| 2012/0254347 A1 | 10/2012 | Seetharam et al. | |
| 2012/0324550 A1* | 12/2012 | Wasilewski | G06F 21/10 726/5 |
| 2013/0027613 A1 | 1/2013 | Kim et al. | |
| 2013/0047175 A1 | 2/2013 | Ramirez Flores et al. | |
| 2013/0132984 A1 | 5/2013 | Walter et al. | |
| 2013/0173765 A1 | 7/2013 | Korbecki | |
| 2013/0290848 A1 | 10/2013 | Billings et al. | |
| 2013/0331087 A1* | 12/2013 | Shoemaker | H04L 67/125 455/420 |
| 2014/0032635 A1 | 1/2014 | Pimmel et al. | |
| 2014/0040942 A1 | 2/2014 | Ellis et al. | |
| 2014/0066098 A1* | 3/2014 | Stern | H04W 4/043 455/456.3 |
| 2014/0067828 A1 | 3/2014 | Archibong et al. | |
| 2014/0075575 A1 | 3/2014 | Kim et al. | |
| 2014/0087752 A1* | 3/2014 | Zhu | H04W 24/00 455/456.1 |
| 2014/0089958 A1 | 3/2014 | Nichols et al. | |
| 2014/0176310 A1* | 6/2014 | Kotlicki | G08C 17/02 340/12.5 |
| 2014/0189720 A1 | 7/2014 | Terrazas | |
| 2014/0259047 A1 | 9/2014 | Bakar et al. | |
| 2014/0341109 A1* | 11/2014 | Cartmell | H04L 45/308 370/328 |
| 2015/0026317 A1* | 1/2015 | Ilsar | H04L 41/0816 709/221 |
| 2015/0095844 A1 | 4/2015 | Cho et al. | |
| 2015/0181286 A1 | 6/2015 | Gonzalez | |
| 2016/0073143 A1 | 3/2016 | Filev et al. | |

OTHER PUBLICATIONS

Don Dodge on The Next Big Thing: Indoor Location startups innovating Indoor Positioning, 5 pages, dated Jun. 19, 2013.

Google Search Appliance Security: Notes from the Field, 41 pages, dated Mar. 2013.

Martin Jan Surminen, et al. Location-based DRM using WiFi Access Points, University of Wollongong Research Online, 2007 International Symposium on Communications and Information Technologies, pp. 880-886.

Daniel Nations. What is AirDrop? How Does It Work? 1 page, retrieved Nov. 26, 2013.

Tile, the world's largest lost and found, 7 pages, retrieved Nov. 26, 2013.

Adena Schutzberg. Ten Tings You Need to Know About Indoor Positioning, Directions Magazine, 10 pages, retrieved Nov. 13, 2013.

Yapeng Wang et al. Bluetooth Indoor Positioning using RSSI and Least Square Estimation, 5 pages, 2010.

Günther, André, and Christian Hoene. "Measuring round trip times to determine the distance between WLAN nodes." Networking 2005. Berlin, 2005. p. 1-12.

How to measure distance between two iphone devices using bluetooth? Stack Overflow, retrieved Nov. 13, 2013, 3 pages.

Joonyoung Jung et al. Distance Estimation of Smart Device using Bluetooth. The Eighth International Conference on Systems and Networks Communications, 2013, p. 13-18.

Harold Naumann, M2M Machine to Machine, dated Aug. 28, 2012, 4 pages.

InSSIDer, Wikipedia, retrieved Nov. 13, 2013, 4 pages.

Kismet (software), Wikipedia, retrieved Nov. 13, 2013, 2 pages.

Daan Scheerens. Practical Indoor Localization using Bluetooth, Jan. 2012, 120 pages.

Liam Boogar, Why Polestar's indoor GPS Technology—10 years in the making—is the future of local commerce, dated Apr. 15, 2013, 3 pages.

Wireshark, Wikipedia retrieved Nov. 13, 2013, 4 pages.

Continuous Indoor Positioning: GNSS: Wi-Fi, and MEMS Dead Reckoning, dated Nov. 1, 2012, 20 pages.

Accurate Mobile Indoor Positioning Industry Alliance, called In-Location, to promote deployment of location-based indoor services and solutions, dated Aug. 23, 2012, 9 pages.

The Ten Commandments of Wireless Communications, B&B Electronics 2009, 6 pages.

Publisher Solutions, Aisle411, 2013, 1 page.

Bluetooth, Wikipedia retrieved Nov. 13, 2013, 23 pages.

Andrei et al. Bluetooth Triangulation, retrieved 2014, 14 pages.

MacRumors Forum, retrieved Nov. 13, 2013, 3 pages.

(56) References Cited

OTHER PUBLICATIONS

Josef Hallberg et al. Abstract Positioning with Bluetooth. CiteSeerX, retrieved Nov. 13, 2013, 1 page.
IPhone 5s: About Touch ID security, retrieved Feb. 12, 2014, 3 pages.
IOS 7: Understanding Location Services, retrieved Feb. 12, 2014, 4 pages.
IOS: Understanding iBeacon, retrieved Feb. 12, 2014, 2 pages.
Location APIs. Android Developers, retrieved Feb. 12, 2014, 1 page.
WiFi Certified Passpoint. Wi-Fi Alliance, retrieved Feb. 12, 2014, 3 pages.
Joyce Wang. Sochi Olympics—A Test Bed for New Comcast Services. CableFax Portal, dated Feb. 3, 2014, 2 pages.
Mobile 4G, WiMAX Forum, retrieved Feb. 12, 2014, 2 pages.
Bluetooth Smart Technology: Powering the Internet of Things. Low Energy Bluetooth Technology Website, 2 pages, retrieved Feb. 24, 2014.
About Z-Wave Technology, 2 pages, retrieved Feb. 24, 2014.
Wi-Fi Direct Wikipedia, retrieved Feb. 25, 2014, 5 pages.
Bluetooth, Wikipedia retrieved Feb. 25, 2014, 23 pages.
"The heat is on: Honeywell is finally challenging the Nest thermostat," Nathan Ingraham, theverge.com, Jun. 10, 2014.
U.S. Appl. No. 13/767,513, Content Delivery, filed Feb. 14, 2013.
U.S. Appl. No. 16/008,350, Merging Permission and Content Access, filed Jun. 14, 2018.

* cited by examiner

| 800 | In home | | | Outside home | | |
|---|---|---|---|---|---|---|
| USER 1 | Living Room | Bedroom | Deck/Porch | Within 20 feet | Within 1 mile | Within 10 miles | Other Location 1 |
| Automated Actions | -switch to default channel -push content to mobile device -full access to streaming content | -turn off living room TV -full access to streaming content -set security system (motion detectors) | -turn off lights in home | -turn on STB -turn on TV -limited access to streaming content | -push content to other devices in same group -limited access to streaming content | -turn up home temperature | -permit third party to push advertisements to mobile device |

| USER 2 | Living Room | Bedroom | Deck/Porch | Within 20 feet | Within 1 mile | Within 10 miles | Other Location 1 |
|---|---|---|---|---|---|---|---|
| Automated Actions | -turn on STB -turn on TV in living room -configure remote control U/I -recommend content | -turn on TV in bedroom -set security system (motion detectors) | -turn off lights in home | -turn off STB -turn off TV in living room -set security system (in its entirety) -lock/unlock doors | -turn down home temperature (thermostat) -permit users in same group to access content | -turn up home temperature (thermostat) | -permit third party to push advertisements to mobile device |

FIG. 8

USER LOCATION AND IDENTITY AWARENESS

BACKGROUND

People often carry their mobile devices with them. As such, a person's location can be determined by determining the location of that person's mobile device. However, current systems for detecting the person's location may be inaccurate, time consuming, or not specific enough. Furthermore, current systems do not provide for dynamic and/or automated actions to be performed based on the person's location, such as within a home.

SUMMARY

This summary is not intended to identify critical or essential features of the disclosures herein, but instead merely summarizes certain features and variations thereof. Other details and features will also be described in the sections that follow.

A method described herein may comprise a determination that a location of a user device cannot be determined using a first wireless protocol. The user device may comprise a mobile device. In response to the determination, the method may comprise attempting to determine the location of the user device using a second wireless protocol. In response to a determination of the location of the user device, the method may comprise using a profile of a user associated with the user device to determine an action corresponding to the location of the user device and sending, to a computing device, an instruction to perform the action. The computing device may comprise at least one of a display device and a set-top box, and the action may comprise generating a content recommendation for the user associated with the user device. Additionally or alternatively, the action may comprise at least one of adjusting a thermostat at the premises, turning on a security system at the premises, and turning off a security system at the premises If the location of the user device cannot be determined using the second wireless protocol, the method may comprise attempting to determine the location of the user device using a third wireless protocol. In some aspects, the first wireless protocol may comprise a short-range wireless protocol, the second wireless protocol may comprise a medium-range wireless protocol, and the third wireless protocol may comprise a long-range wireless protocol. In some aspects, the first wireless protocol may comprise Bluetooth, the second wireless protocol may comprise Wi-Fi, and the third wireless protocol may comprise at least one of a Global Positioning System (GPS) protocol and a cellular protocol. In yet other aspects, the first wireless protocol may comprise Bluetooth, and the second wireless protocol may comprise at least one of a cellular protocol, Wi-Fi, and GPS.

If the first wireless protocol comprises Bluetooth, the method may comprise determining that the user associated with the user device is not at home in response to a determination that the location of the user device cannot be determined using Bluetooth. If the second wireless protocol comprises Wi-Fi, the method may comprise determining that the user device is within a predetermined distance from the premises in response to a determination of the location of the user device using a Wi-Fi network at a premise of the user. An instruction may be sent to a gateway device at the premises in response to a determination that the user device is within the predetermined distance from the premises A method described herein may comprise determining a first signal strength of a first wireless transmission between a user device and a first device and determining a second signal strength of a second wireless transmission between the user device and a second device. The device may comprise a mobile device. The first wireless transmission and the second wireless transmission may comprise Bluetooth transmissions. The location of the user device may be determined based on the first signal strength and the second signal strength. In some aspects, the location may be within a premise, such as a user home. In response to a determination of the location of the user device, the method may comprise sending, to a computing device within the premises, an instruction to perform an action corresponding to the location of the user device.

In some aspects, determining the location of the user device based on the first signal strength and the second signal strength may comprise determining that the first signal strength is greater than the second signal strength. In response to determining that the first signal strength is greater than the second signal strength, the method may comprise determining that the location of the user device is a first room within the premises, where the first device is located in the first room.

The location of the user device within the premises may be a first room within the premises, and the first device may comprise a Bluetooth device located in the first room. The second device may comprise a Bluetooth device located in a second room. Where the location within the premises comprises a room within the premises, the action may comprise turning on at least one of a display device and a set-top box located in the room. Additionally or alternatively, the action may comprise displaying a content recommendation for a user associated with the user device, and the computing device receiving the instruction may comprise at least one of the user device and a display device at the location within the premises.

A method described herein may comprise a determination that a location of a device cannot be determined using a first wireless network. In response to the determination, the method may comprise attempting to determine the location of the device using a second wireless network. A user of the device may be permitted to access a group of content items based on the location of the device and in response to a determination of the location of the device. In some aspects, a plurality of other devices may be permitted to access the group of content items in response to permitting the user to access the group of content items based on the location of the device. Furthermore, the plurality of other devices might not be located at the same location as the device. If it is determined that the device is no longer at the location, the plurality of other devices may be prevented from accessing the group of content items.

In some aspects, the device may comprise a first device, and the group of content items may comprise a first group of content items. The method may further comprise permitting the user of the first device and a user of a second device to access the first group of content items and a second group of content items in response to a determination that the second device in a same group as the first device is at the location of the first device. The method may also include permitting the user of the first device, the user of the second device, and a user of a third device to access the first group of content items, the second group of content items, and a third group of content items in response to a determination that the third device in the same group as the first and second devices is at the location of the first and second devices. A message notifying each of the devices of content restrictions for each device may be sent.

The method may further comprise determining whether the device is within a premises associated with the user of the device. Furthermore, permitting the user of the device to access the group of content items based on the location of the device may comprise permitting the user of the device to access a first group of content items if the device is within the premises, and permitting the user of the device to access a second group of content items if the device is not within the premises. The second group of content items may be smaller than the first group of content items. In some aspects, determining whether the device is within the premises may comprise determining whether a Bluetooth signal can be transmitted between the device and a Bluetooth device located in the premises. The foregoing methods and other methods described herein may be performed by a system, a computing device, a computer readable medium storing computer-executable instructions for performing the methods, and/or an apparatus having a processor and memory storing computer-executable instructions for performing the methods.

BRIEF DESCRIPTION OF THE DRAWINGS

Some features herein are illustrated by way of example, and not by way of limitation, in the figures of the accompanying drawings and in which like reference numerals refer to similar elements.

FIG. 8 illustrates example user profiles that correspond users' locations to automated actions according to one or more illustrative aspects of the disclosure.

DETAILED DESCRIPTION

Figure 1:
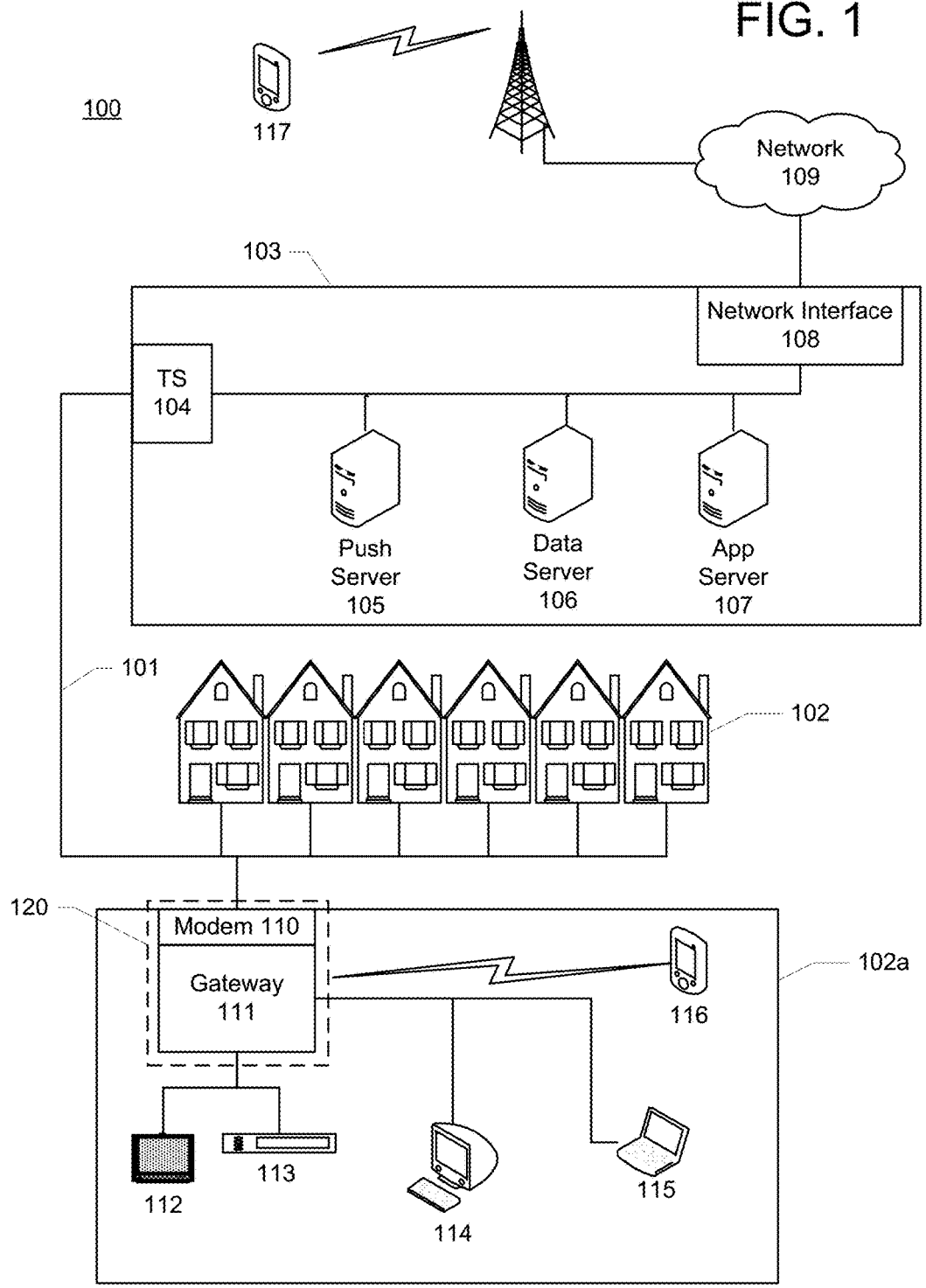
FIG. 1 illustrates an example information access and distribution network.

FIG. 1 illustrates an example information access and distribution network 100 on which many of the various features described herein may be implemented. The network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as locations 102 (e.g., homes, businesses, institutions, etc.), to a local office 103 (e.g., a central office or headend). The local office 103 may transmit downstream information signals onto the links 101, and each location 102 may have a receiver used to receive and process those signals.

There may be one link 101 originating from the local office 103, and it may be split a number of times to distribute the signal to various locations 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as modems at the various locations 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the network 109, and to other devices on the network such as a cellular telephone network and its corresponding cell phones (e.g., cell phone 117).

As noted above, the local office 103 may include a variety of servers 105-107 that may be configured to perform various functions. For example, the local office 103 may include a push notification server 105. The push notification server 105 may generate push notifications to deliver data and/or commands to the various locations 102 in the network (or more specifically, to the devices in the locations 102 that are configured to detect such notifications). The local office 103 may also include a data server 106. The data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the locations 102.

An example location 102a may include an interface 120. The interface may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway 111 (e.g., a gateway interface device). The gateway 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
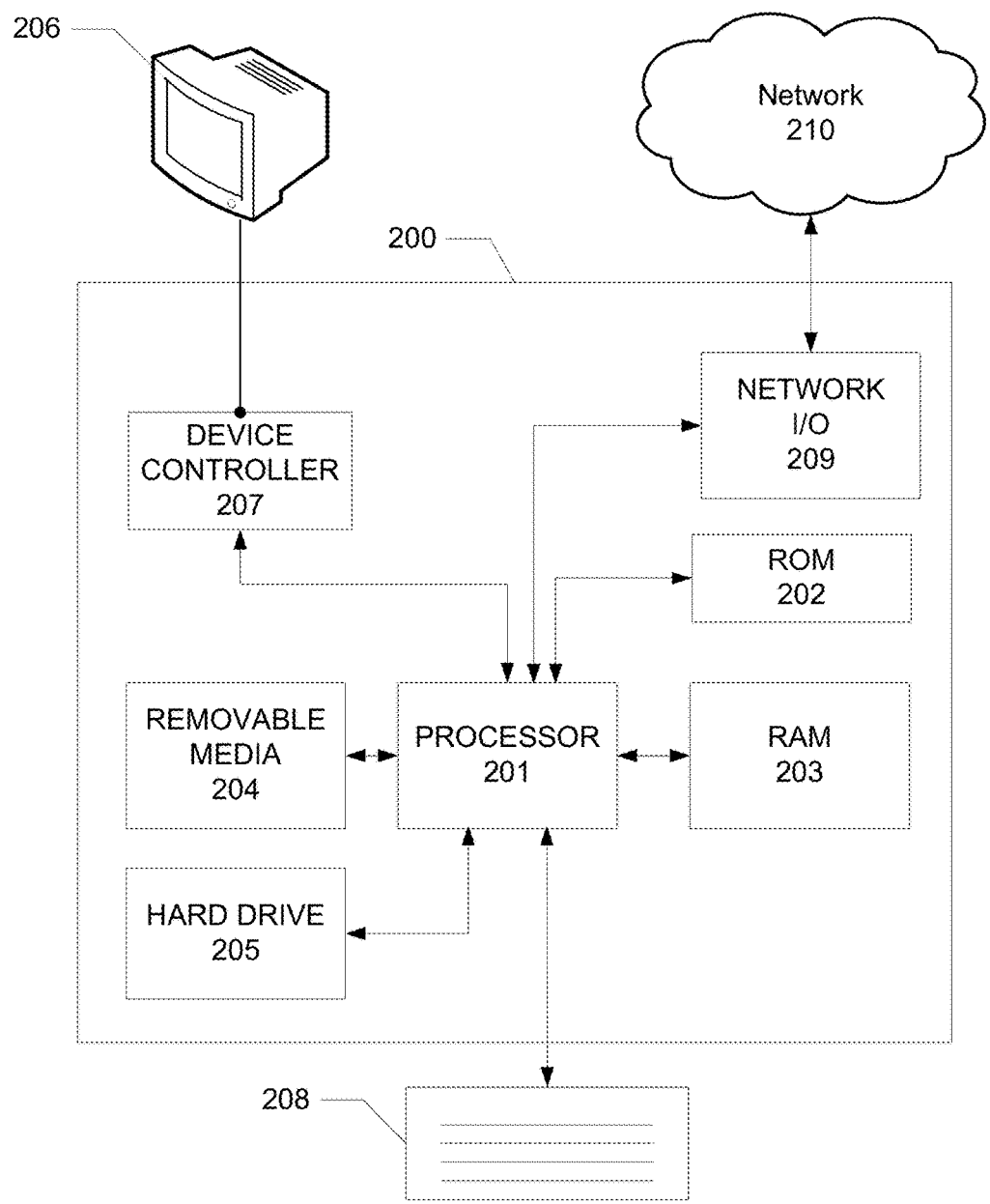
FIG. 2 illustrates an example hardware and software platform on which various elements described herein can be implemented.

FIG. 2 illustrates general hardware and software elements that can be used to implement any of the various computing devices (e.g., terminal devices, remote control devices, etc.) discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc.

The computing device 200 may also include one or more network interfaces 209, such as input/output circuits (such as a network card) to communicate with an external network 210. The interface 209 may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network. The computing device 200 may communicate with the external networks 210 or other devices using one or more communication protocols, such as wired communication protocols and wireless communication protocols (e.g., Wi-Fi, Bluetooth, ZigBee, Z-Wave, etc.).

Figure 3:
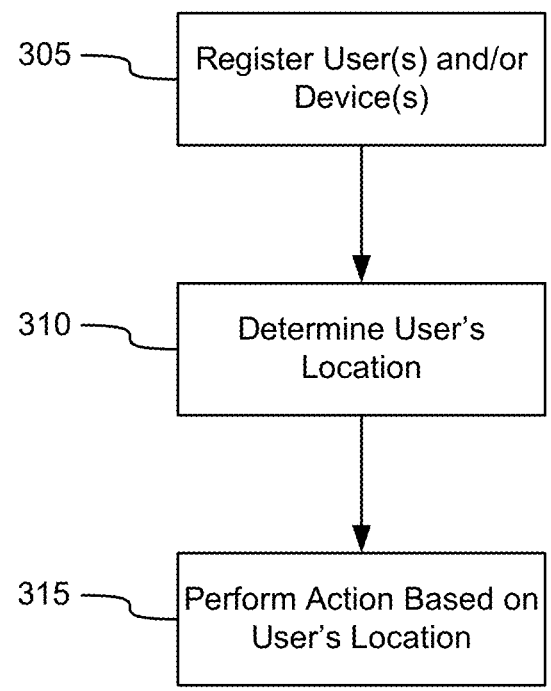
FIG. 3 illustrates an example summary of a method of performing actions based on a user's location according to one or more illustrative aspects of the disclosure.

FIG. 3 illustrates an example summary of a method of performing actions based on a user's location according to one or more illustrative aspects of the disclosure. The steps may be performed by one or more computing device (such as a device at the location 102a, a device at the local office 103, and/or a remote device that can communicate with the location 102a or the local office 103). In step 305, the computing device may register a user and/or the user's devices (e.g., a mobile device, such as a cell phone) for location services. The computing device may also generate and/or store a user profile that correlates automated actions with the user's current location, as will be described in further detail in the examples that follow. The location services described herein may be opt-in. Therefore, each user may decide whether or not to have his or her location tracked for use with the location services by, e.g., registering with the system. Step 305 will be described in further detail in the examples that follow, such as with reference to FIG. 5.

In step 310, the computing device may determine the user's location by, for example, determining the location of the user's mobile device. As will be discussed in the examples below (such as with reference to FIG. 9), the computing device may use several different wireless communication protocols and/or wireless networks (e.g., Bluetooth, Wi-Fi, Cellular, and/or GPS) in a hierarchical manner to determine the user's location.

In step 315, the computing device may perform one or more actions based on the user's current location. For example, the computing device may send an instruction to a display device or set-top box located in the same room as the user to turn on or to display a content recommendation tailored to the user. As another example, the computing device may send an instruction to deactivate a home security system when the user is within a predetermined distance from the home (e.g., just outside the door of the home or 100 feet from the home). Step 315 will be described in further detail in the examples that follow (such as with reference to FIGS. 10 and 11).

Figure 4:
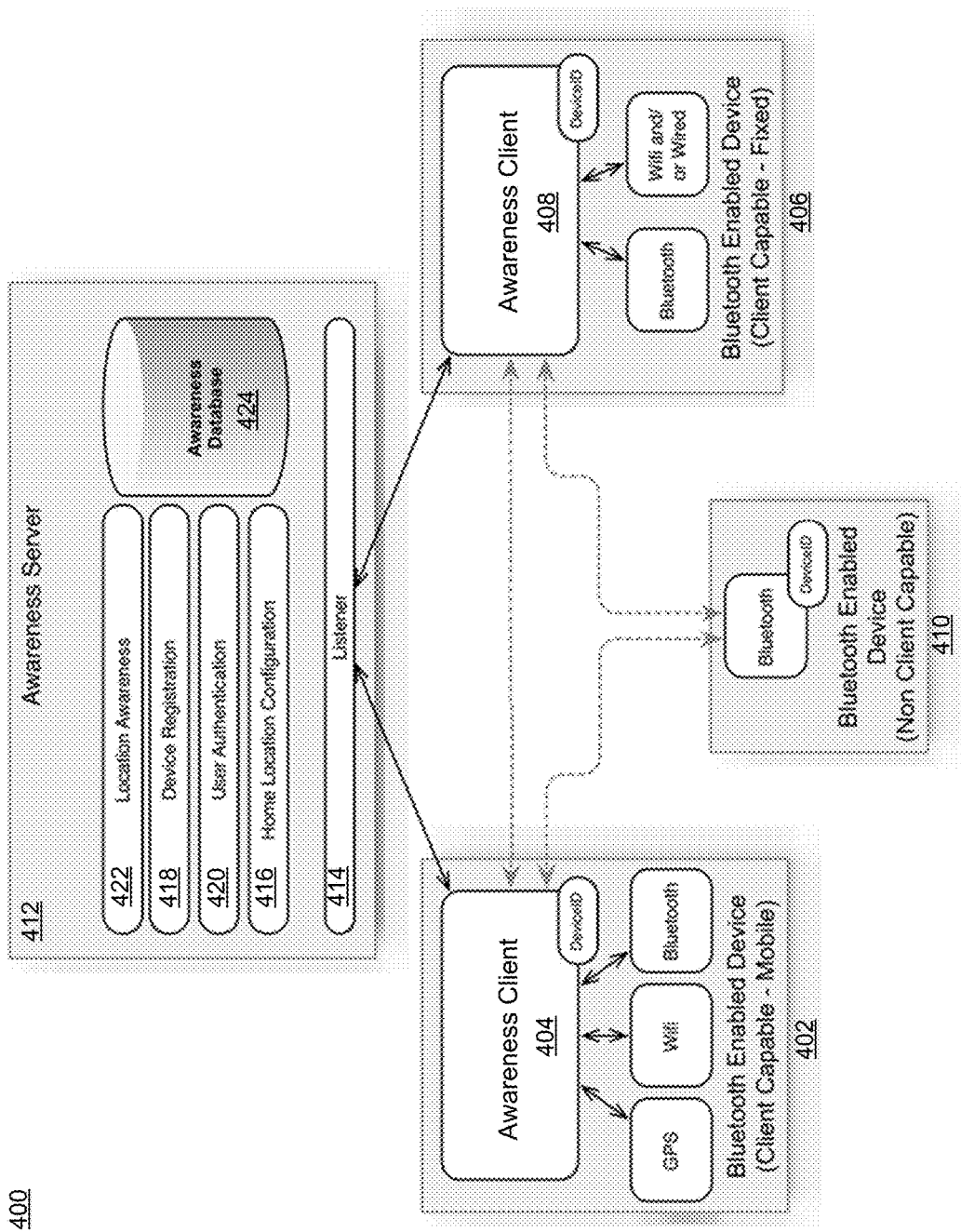
FIG. 4 illustrates an example network of devices used to determine users' locations and corresponding actions based on users' locations according to one or more illustrative aspects of the disclosure.

FIG. 4 illustrates an example network 400 of devices used to determine users' locations and corresponding actions based on users' locations according to one or more illustrative aspects of the disclosure. The network 400 may include a user device 402, such as a mobile device. Examples of mobile devices include, for example, a mobile phone 116 or 117, a tablet, a laptop computer 115, a PDA, or any other desired device. The mobile device 402 may include an awareness client 404, which may be a software client running on the mobile device 402. In some aspects, the awareness client 404 may run over a mobile operating system, such as GOOGLE ANDROID, APPLE iOS, and the like. The mobile device 402 may also have an associated device identifier, such as an IP address, a range of IP addresses, a MAC address, a device name, or any other identifier that uniquely identifies the mobile device 402. The user may also be able to assign an identifier to the mobile device 402, such as naming the device. The mobile device 402 may also have wireless (or wired) communication and/or location capabilities. For example, the mobile device 402 may have a GPS transceiver, a Wi-Fi transceiver, and a Bluetooth transceiver. Although not illustrated, the mobile device 402 may also have other transceivers, such as a cellular transceiver for communicating over cellular telephone networks. As will be discussed in further detail below, the mobile device 402 may send and receive messages over GPS, Wi-Fi, Bluetooth, and/or cellular networks to determine its location and/or which networks and devices the mobile device 402 is or can connect to. The location information may be transmitted, such as by the awareness client 404 of the mobile device 402, to the awareness server 412, as will be discussed in further detail below.

The network 400 may also include a device 406, such as an STB, a gateway, a television, a PC, or any other desired device. The device 406 may be fixed in its location such that it is typically not moved by the user. The fixed device 406 may have all or some of the same capabilities as the mobile device 402. For example, the fixed device 406 may be associated with a unique identifier. A user may name his or her set-top box (e.g., Corey's Living Room set-top box). The fixed device 406 may also have an awareness client 408 running over an operating system. The fixed device 406 may also have wireless (or wired) communication and/or location capabilities. The example fixed device 406 illustrated in FIG. 4 has a Bluetooth transceiver, a Wi-Fi transceiver, and an interface for wired communications (e.g., Ethernet, coaxial communication, optical fiber communication, etc.). The fixed device 406 may also send and receive messages over wireless or wired networks to determine its location and/or which networks and devices the fixed device 406 is or can connect to. For example, the fixed device 406 may communicate with the mobile device 402 via Bluetooth or Wi-Fi. Location information may be transmitted, such as by the awareness client 408 of the fixed device 406, to the awareness server 412, as will be discussed in further detail below.

The network 400 may also include a device 410, which may be a device capable of communicating using a limited number of communication protocols. The example device 410 illustrated in FIG. 4 can communicate with other devices via Bluetooth. However, the device 410 might not be able to communicate over, for example, GPS, Wi-Fi, and/or cellular signals. In some embodiments, an awareness client could be placed on the Bluetooth-only device 410. However, this need not be the case; the Bluetooth-only device 410 might not have an awareness client. The Bluetooth-only device 410 may broadcast Bluetooth messages, which may be used to analyze signal strengths in order to determine or refine the location of user devices and their associated devices, as will be discussed in further detail in the examples below. The Bluetooth-only device 410 may also be registered (e.g., paired) with one or more other devices, such as the mobile device 402 and the fixed device 406. The Bluetooth devices may be located, for example, at the user's home, in a particular room in the user's home, in the user's car, outside of the user's home, etc.

The network 400 may also include an awareness server 412. The awareness server 412 may comprise one or more computing devices, such as the servers 105, 106, and/or 107 at the local office 103. The awareness server 412 may also be cloud-based, utilizing one or more networked computing devices to receive, process, store, and send information. In some aspects, the awareness server 412 may receive information (including location information) from the devices 402 and 406. For example, the awareness clients 404 and 408 of the devices 402 and 406, respectively, may send information in real time to a listener 414 of the awareness server 412. The listener 414 may comprise a software application that actively prompts and/or listens for information, including requests made, from various client devices.

The awareness server 412 may include other software and/or hardware components. For example, a home location configuration application 416 may allow a user to configure his or her home topology and map devices to the configured topology. A device registration application 418 may allow a user to register devices (discovered by the user device 402, such as other user devices, and Bluetooth-enabled devices). The device registration application 418 can also be populated by other means such as with information for devices that are purchased via other means (like buy flows or point of sale applications). A user authentication application 420 may correlate user devices with user identifiers, such as usernames/passwords for a service provider account, a social media account (e.g., FACEBOOK, TWITTER, and the like). By correlating user devices with user identifiers, the user might not have to provide a password to log into each account. Rather, the user might automatically be logged on to some or all of the user's accounts by, for example, bringing his or her device within the proximity of another device, such as a fixed device in the home.

A location awareness application 422 may be used to determine where the user is located based on one or more pieces of information it has received from the devices 402 and/or 406. Example location information include, but are not limited to, identity of the Bluetooth device having the highest signal strength relative to the user device, Wi-Fi or wired Internet Protocol information, mobile geo-location information (e.g., from GPS or cellular radios), and other device and user information the location awareness application 422 could access on its own (e.g., information stored in the cloud). The location awareness application 422 may determine (or estimate) the user's location, the identity of the user, and which devices (e.g., the mobile device 402, the fixed device 406, or the Bluetooth device 410) the user is using or is near. User, device, location (raw or determined), and other information may be stored in an awareness database 424. The methods described herein may be performed by the aforementioned network of devices 400 or by a similar system.

In some aspects, all or a portion of the information stored in the awareness server may be replicated or otherwise copied to a device in the location 102a and/or user device. For example, a particular user's profile, which might include user information, device information, location information, and other information, may be cached at a device in the location 102a, such as the gateway 111. The same may be done for other users (e.g., users at each of the locations 102). By caching the information, the amount of time to access the information may be reduced.

Figure 5:
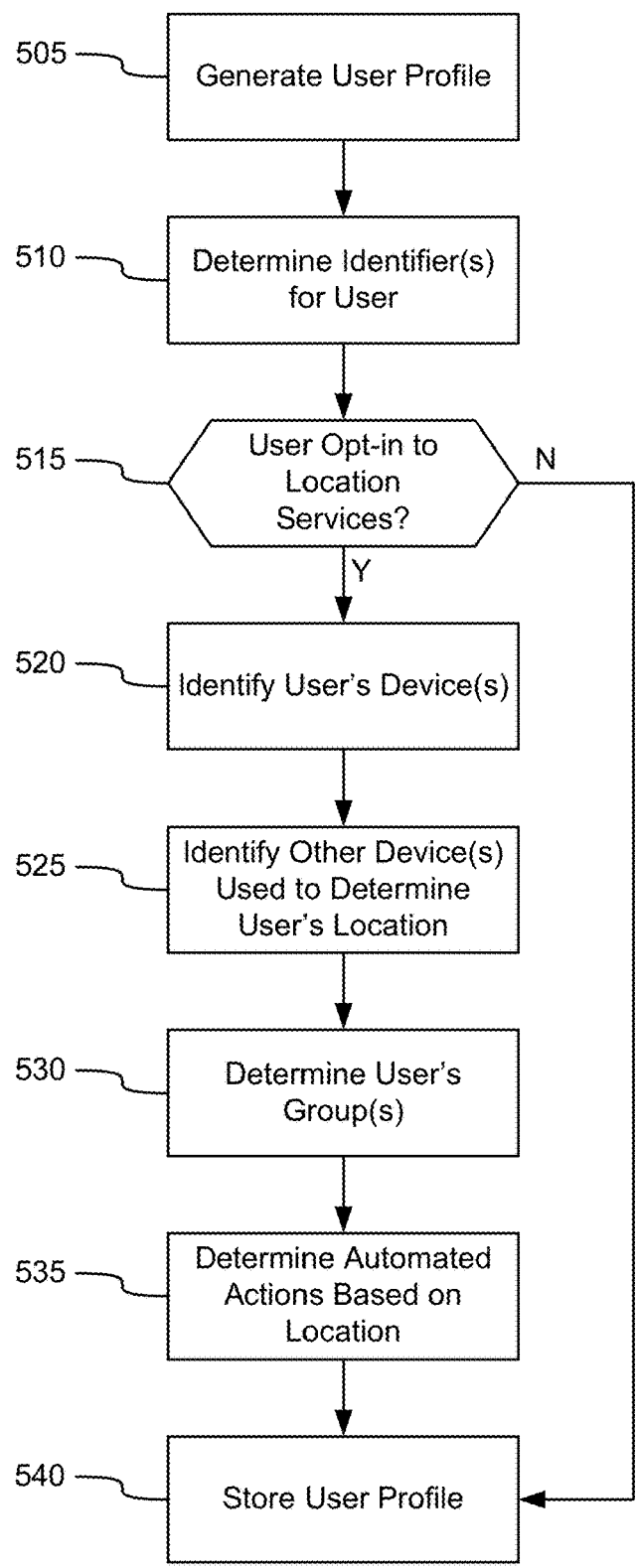
FIG. 5 illustrates an example method of generating and storing a user profile according to one or more illustrative aspects of the disclosure.

FIG. 5 illustrates an example method of generating and storing user profiles according to one or more illustrative aspects of the disclosure. The method may be performed by any of the computing devices described herein, including cloud computing devices, computing devices at the local office 103, computing devices within the location 102, and/or mobile computing devices (e.g., a mobile phone).

In step 505, the computing device may generate (e.g., create) a user profile used for or associated with location services. Location services may include, for example, tracking the user's location and performing automated actions based on the user's location. If a profile for the user already exists, such as if it was previously generated, the computing device may instead retrieve the user's profile. For example, a user profile may have been generated when the user signed up for internet access through an internet (or other) service provider. When the user desires to sign up for location services, the computing device may retrieve the user's internet service provider profile rather than generating a new profile. As will be discussed in further detail in the examples below, the user profile may identify users' preferences and be used to identify the topology of the user's home, devices, identifiers, telephone numbers, and the like. For example, the user profile may associate the user's locations with one or more automated actions.

Figure 6:
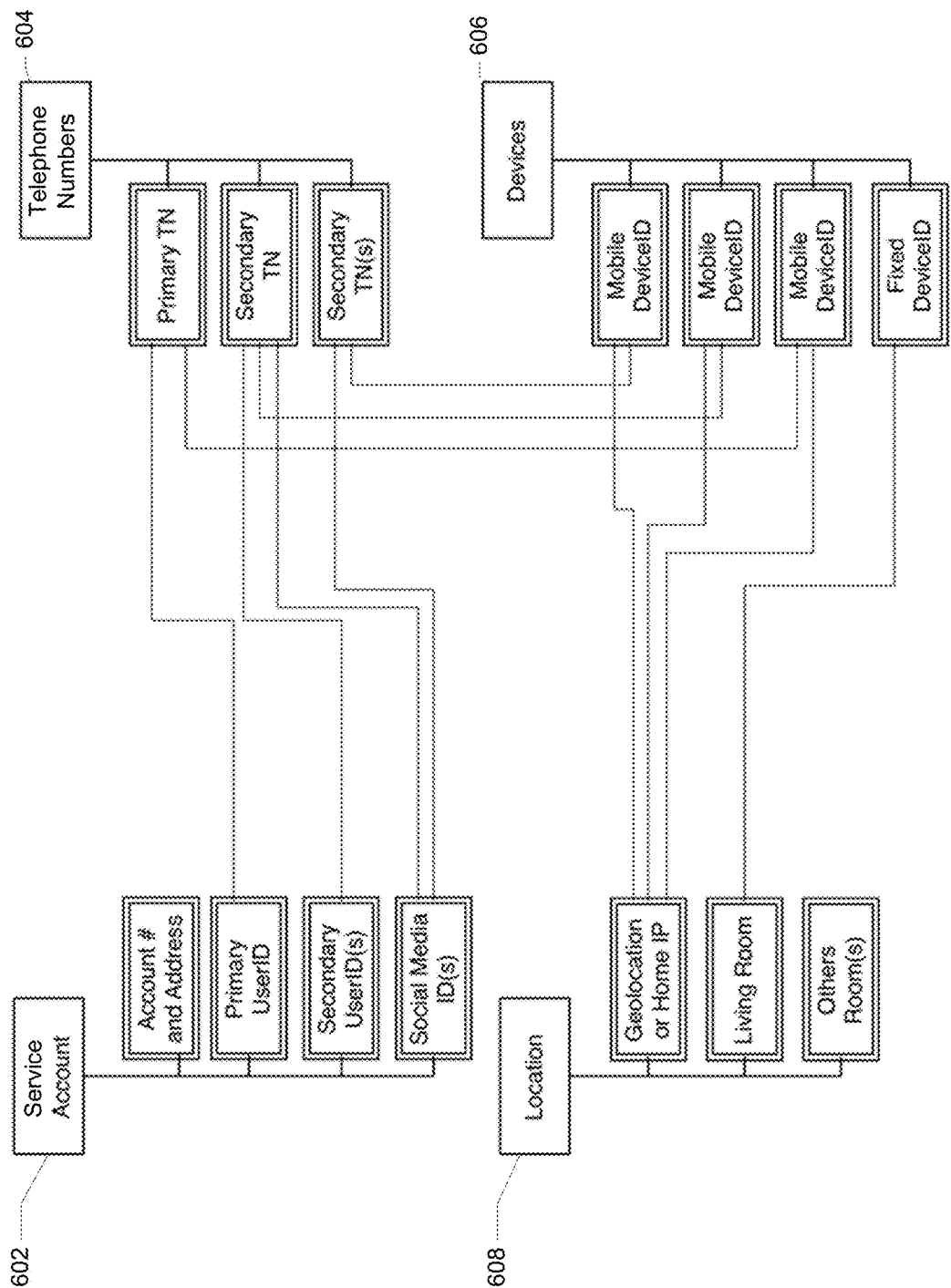
FIG. 6 illustrates an example interconnection of users' service accounts, locations, telephone numbers, and device identifiers according to one or more illustrative aspects of the disclosure.

In step 510, the computing device may determine identifiers for the user. Referring now to FIG. 6, FIG. 6 illustrates an example interconnection of users' service accounts, locations, telephone numbers, and device identifiers according to one or more illustrative aspects of the disclosure. Example user identifiers may be associated with data from one or more service accounts 602, such as an account number, a user's physical address, a user's email address, the primary accountholder's user identifier, a secondary accountholder's user identifiers, and social media identifiers (e.g., FACEBOOK username and/or password, TWITTER username and/or password, and the like).

User identifiers may also comprise (or be associated with) one or more telephone numbers 604, such as the user's telephone number (e.g., a mobile phone number), a primary user's primary telephone number, a primary user's secondary telephone number, a secondary user's primary telephone number, and a secondary user's secondary telephone number. Each of the telephone numbers 604 may be mapped to a service account identifier 602. For example, a user's primary telephone number 1-123-456-7890 may be mapped to (or otherwise correlated with) the primary user's service account ID. A secondary user's primary telephone number 1-555-333-1212 may be mapped to the secondary user's identifier (e.g., test_user@comcast.net) and the secondary user's FACEBOOK account.

In some aspects, primary and secondary users may form a group of users for location services. A primary user may add one or more secondary users to the primary user's account. The secondary users may, but need not, be related to the primary user. For example, the group may comprise a mobile phone family plan. Each family member's mobile number may be mapped back (e.g., paired) with that family member's service account identifier. Alternatively, more than one family member's number could be mapped to a single service account identifier, or more than one service account identifier could be mapped to a single telephone number. Details on grouping users for location services will be discussed in further detail in the examples below.

Returning to FIG. 5, in step 515, the computing device may determine whether the user has opted-in to location services (e.g., to have the user's locations tracked). If the user has not opted-in to location services, the method illustrated in FIG. 5 may end, and the computing device may store the user's profile in step 540. If the user has opted-in to location services, the computing device may add and/or correlate other information with the user's profile. In some aspects, the location services may alternatively be opt-out.

In step 520, the computing device may identify and/or store an identifier for each of the user's devices. The user may provide a list of his or her devices to the computing device. Additionally or alternatively, the computing device may automatically detect the user's devices. For example, the computing device may identify each device having a location service application, such as the awareness client 404 or the awareness client 408 that the user has signed on to. The computing device may also automatically add devices that connect to a particular network (e.g., an in-home Wi-Fi network or Z-Wave network) to the list of devices. When a device is automatically added, the computing device may trigger a message (e.g., an email, a text message, a popup message, etc.) to be sent to an owner of the network to validate the device (e.g., as a trusted device or a guest device). A website or mobile application may also be used to correlate a user with the user's devices. For example, a graphical user interface (GUI) used to configure the topology of the user's home, such as a GUI similar to the one illustrated in FIG. 7, may be used by the user to input information for the user's devices. Social media accounts may also be used to link users to devices. For example, when the user signs on to the social media account on a particular device, the website or application used to perform the sign-on could send information identifying the user device to the awareness server 412 to be stored in the awareness database 424.

As previously discussed, the devices may include a mobile phone, tablet, laptop computer, PDA, or any other mobile device (e.g., devices that the user might carry). As illustrated in FIG. 6, each device 606 may have one or more device identifiers. Example identifiers include IP addresses, MAC address, device name, or any other identifier that uniquely identifies the device, as previously discussed. As illustrated in FIG. 6, each device can be mapped to one or more telephone number 604, which may in turn be mapped to one or more service account identifier 602. Alternatively, a device may be mapped directly to a service account identifier 602, such as if the device does not have a telephone number (e.g., a Wi-Fi only device).

Returning to FIG. 5, in step 525, the computing device may identify and/or store an identifier for other devices that may be used to determine the user's location. These other devices may include, for example, the fixed devices 406 and/or the Bluetooth-enabled devices 410 illustrated in FIG. 4. The methods for identifying these other devices may be the same (or similar) to the methods used to identify the user's devices described with reference to step 520. For example, the user may provide a list of these devices to the computing device, or the computing device may automatically detect these devices. For Bluetooth-compatible devices, the device name or ID may be part of the Bluetooth specification.

A gateway device, such as the gateway 111, may be used to determine the user's location. For example, the gateway 111 may be a set-top box with Bluetooth capability. As will be discussed in the examples below, Bluetooth communications between the set-top box and the user device may be used to determine the user's current location. In other words, if a user device detects a Bluetooth signal from the set-top box (or vice versa), the server may determine that the user is in the same room as the set-top box. As another example, the gateway 111 may be (or be connected to) a wireless (e.g., Wi-Fi) router that provides a wireless network. As will be discussed in the examples below, the device's connection to the wireless network may be used to determine that the user is currently within the home or a predetermined distance from the home. Furthermore, IP addresses (or address ranges) may identify the physical location of the device having the IP address or IP address range. For example, a home Wi-Fi network might have a predetermined IP address range. If a device has an IP address within that range, the computing device may determine that the device is within the home (or a predetermined distance from the home).

Any of the mobile devices 402, fixed devices 406, and Bluetooth-enabled devices 410 may be used to identify any of the other mobile, fixed, and Bluetooth-enabled devices. For example, the mobile device 402 may have an application, which may be the awareness client 404, that scans for other devices with Bluetooth capabilities within the Bluetooth range of the mobile device 402, such as the fixed device 406 (if it has Bluetooth capabilities) or the Bluetooth-enabled device 410. The mobile device 402 may identify the Bluetooth-enabled device during an exchange of messages with that device over Bluetooth. For example, the Bluetooth-enabled device may send an identifier for itself to the mobile device 402 during the exchange. The mobile device may send, to the awareness server 412, identifiers for the Bluetooth-capable devices it detects, and the identifiers may be stored in the profile of the user associated with the mobile device 402. This may be especially beneficial when a Bluetooth-enabled device 410 cannot communicate directly with awareness server 412. The fixed device 406 may similarly be used to identify other mobile, fixed, and Bluetooth-enabled devices and send the identifiers to the awareness server 412.

Figure 7:
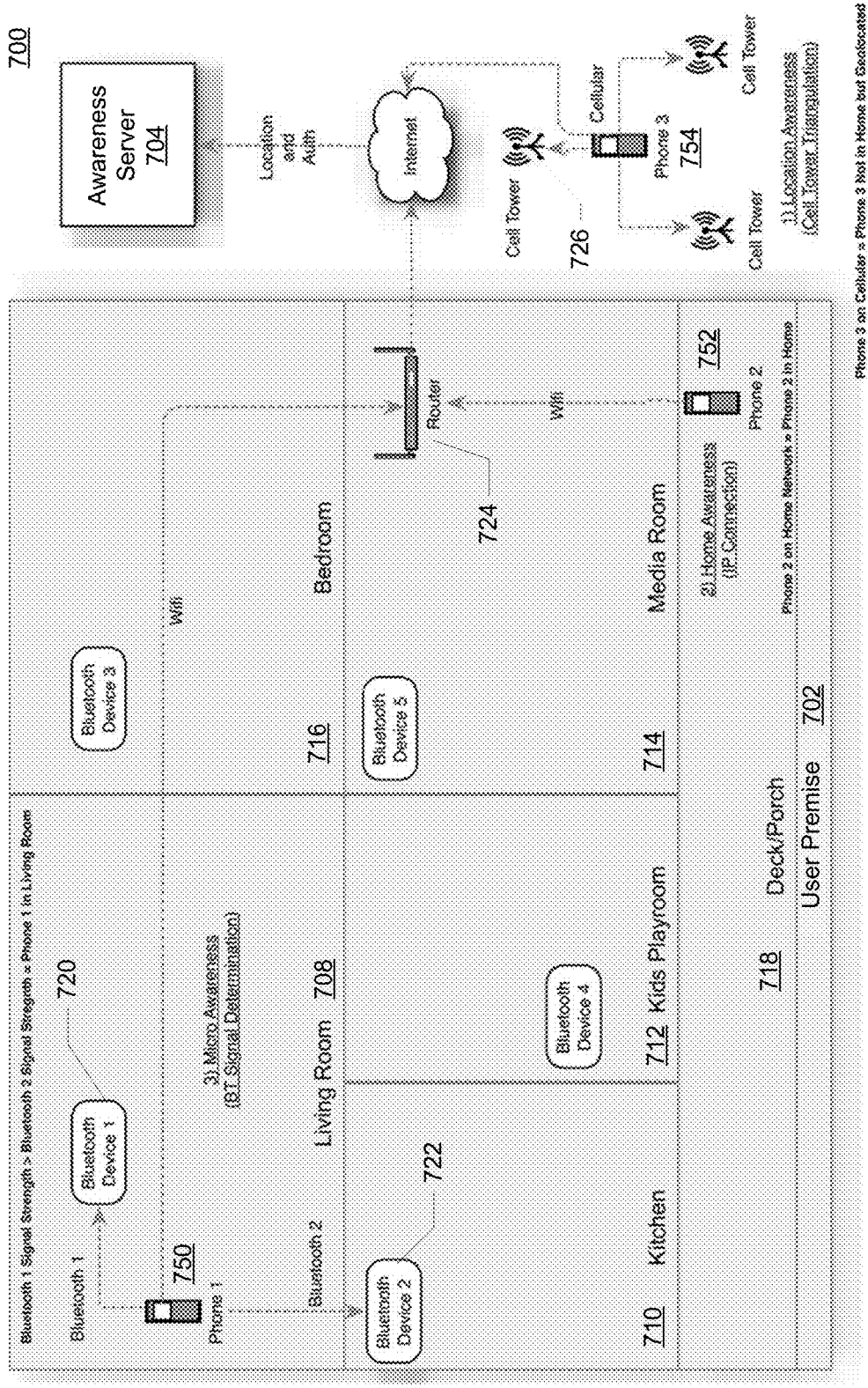
FIG. 7 illustrates an example network comprising a user premise, an awareness server, user devices, and other devices used to determine the user's location according to one or more illustrative aspects of the disclosure.

Returning to FIG. 5, in step 525, the computing device may also determine and/or store the location of each device that may be used to determine the user's location or otherwise associate the device with the user. For example, in FIG. 6, devices 606 may be associated with one or more location 608. Referring now to FIG. 7, FIG. 7 illustrates an example network 700 including a user premise 702, awareness server 704, user devices 750, 752, and 754, and other devices used to determine the user's location according to one or more illustrative aspects of the disclosure. Awareness server 704 may correspond to, for example, awareness server 412 illustrated in FIG. 4 and be used to store user profiles, determine the user's location, and/or determine actions to perform based on the user's current location. As previously discussed, the topology of network 700 may be generated based on user input or configuration. For example, the user may input the topology via a user configuration GUI on the user's phone, laptop, etc. The user may provide the rooms and each device located in the rooms, as will be discussed in the examples below.

User premise 702 may be, for example, one of the locations 102 illustrated in FIG. 1. However, the user premise 702 is not limited to a home and may include any other type of user premises, such as businesses, institutions, etc. The user premise 702 can be physically or virtually divided into, for example, different regions (e.g., areas or rooms). Each distinct region can be inside or directly outside of the user premise 702. Example user premise 702 includes a living room 708, kitchen 710, kid's playroom 712, media room 714, bedroom 716, and deck/porch 718. The deck/porch 718 may be directly outside of the user premise 702, whereas the remaining rooms may be inside the user premise 702.

The network 700 may include one or more mobile devices associated with the user, such as a mobile phone 750, a mobile phone 752 (or, alternatively, a laptop), and a mobile phone 754 (or, alternatively, a tablet computer). The network 700 may also include devices used to determine the user's location, which might be located inside or outside the user premise 702. For example, a Bluetooth device 720 may be located in the living room 708. A Bluetooth device 722 may be located in the kitchen 710. A wireless (e.g., Wi-Fi) router 724 may be located in the media room 714 or any other room within the user premise 702. Cell towers 726 may be located outside of the user premise 702. Other devices used to determine the user's location that are not illustrated in FIG. 7 include, for example, GPS satellites, Bluetooth devices within or integrated with the user's car, and other devices capable of connecting with the user's mobile devices 750, 752, and/or 754.

The computing device may determine the location of each device that could be used to determine user's location. The user may manually enter the location for each device into the user's device (e.g., the mobile phone 750). For example, the user may enter the device identifier (e.g., a name for the Bluetooth Device 720) and the location of the device (e.g., the living room 708) into the user's mobile device 750. As discussed above, the user may provide information to a GUI to associate devices with rooms. Alternatively, the awareness server 704 might already know the identity of each of the devices, but not know the location of each device. The awareness server 704 may send the identity information to the user's mobile device 750, and the mobile device 750 may prompt the user to input the location for each of the devices. Once the user provides the location for each device, the locations may be stored in the user's profile (e.g., in an awareness database 424 in the awareness server 704).

In some aspects, the location of each device may be determined based on the name of one of the devices (e.g., a gateway device) and its proximity to other devices. For example, a user may name the user's STB "Living Room's Set Top Box." The computing device may determine that that particular STB is in the Living Room 708 based on character recognition or other text matching method. If other devices connect to the Living Room Set Top Box, such as via Bluetooth or other short-range protocol, the computing device may determine that those devices are also in the Living Room 708. The signal strength of such connections may also be used to determine the location of those other devices, as will be discussed in further detail, e.g., with respect to FIG. 9.

Alternatively, the awareness server 704 might already know the topology (e.g., layout) of the user premise 702, including that the user premise 702 has a living room 708, kitchen 710, kids playroom 712, media room 714, bedroom 716, and deck/porch 718. For example, the user may have provided the awareness server 704 with the topology of the home when the user registered for services, such as mobile phone services, internet services, content services, etc. Alternatively, the topology of the home may be pulled from public records for structures such as if the user has made the topology or blueprint of the home public and available through a title company. The awareness server 704, however, might not know which devices are in each room. The awareness server 704 may send a list of rooms in the home to the user's mobile device 750, and the mobile device 750 may prompt the user to identify devices in each of the rooms. For example, the mobile device 750 may display "Living Room." The user may input a device identifier for the Bluetooth Device 720, such as the name "Living Room Bluetooth Speakers." Alternatively, the mobile device 750 may pair with the Living Room Bluetooth Speakers and automatically send an identifier for the speakers to the awareness server 704. After receiving the information, the awareness server 704 may correlate the Living Room 708 with the Living Room Bluetooth Speakers 720. Information identifying each of the Bluetooth device 722 in kitchen 710, the Bluetooth device in the kid's playroom 712, the Bluetooth device in the media room 714, and the Bluetooth device in the bedroom 716 may be provided to the awareness server 704 in a similar manner as the Bluetooth device 720.

Instead of the user's mobile device sending the information to the awareness server 704, a different device, such as a fixed device 406 or any other device that can communicate with the awareness server, may provide the location and/or device information. For example, the user may utilize the input/output capabilities of a display device (e.g., a television) and/or a gateway device (e.g., a set-top box or router) to provide location and/or device information to the awareness server 704. When the awareness server 704 receives the location or device information, it can store the information in the user's profile.

Returning to FIG. 5, in step 530, the computing device may determine groups, such as permission groups, that the user belongs to or should belong to. The computing device may generate a new permission group with the user as a member. Alternatively, the computing device may add the user to an already-existing permission group. As previously discussed, a primary user and secondary users in a content service account or mobile telephone service account may be included in the same group. For example, the group may include all members on the same mobile service account (e.g., all family members on a family plan). A user, such as the primary user, may have the authority to add other users to the group. Alternatively, each user of the group may have the authority to add other users to the group. In some aspects, the location service provider, content service provider, mobile phone service provider, or any other service provider associated with the users and/or groups might have to give permission to the user to add additional users to the group.

Each user may also have one or more devices, such as mobile devices 606 illustrated in FIG. 6. Each user's devices may be mapped to one or more telephone number 604 and/or service account identifier 602. By binding devices to one another and/or to telephone numbers or service account identifiers, authentication and content access permissions may be established for devices in the group.

The user's device, such as a mobile phone, may be used to authenticate the user, such as for services and/or products. For example, the user may seamlessly sign on for services and/or products (e.g., to access content items, to access mobile phone services, etc.) using his or her mobile phone. In other words, the phone may act as a mobile wallet or passport for signing in the user for any products and services associated with the user's or user device's identifiers (e.g., the service account identifiers 602, the telephone numbers 604, the device identifiers 606, and the like). By using the device for authentication, the user might be able to access these services and/or products without having to manually authenticate him or herself (e.g., by entering a username and password).

Users within the same group may also be authenticated using their devices. For example, if a user within the group is authenticated for a product or service using the user's device, the other users in the group may be automatically authenticated for the same product or service. Individual and group authentication may also be based on one or more users' locations, as will be described in more detail in the examples below.

Content access permissions may also be set for an individual user or users in the same content access permission group. For example, if one user is permitted to access particular content, other users in the same group may be permitted to access the same content, without the other users having to be separately authenticated to access the content. Individual and group content access permissions may also be based on one or more users' locations, as will be described in more detail in the examples below.

Users may optionally be categorized as trusted (e.g., associated with a permanent device) or untrusted (e.g., associated with a guest device). A trusted device may be permitted to access more services than untrusted/guest devices. Furthermore, trusted users may be permitted to temporarily add guest devices to the group. For example, a friend may visit a primary user's home and connect to one or more of the home's networks. The primary user may be permitted to temporarily add the friend's device to the primary user's group.

In step 535, the computing device may determine automated actions to take based on the user's current location. FIG. 8 illustrates example user profiles 800 that correlate users' locations to automated actions according to one or more illustrative aspects of the disclosure. For simplicity, other information stored in the user's profile are not illustrated in FIG. 8. The example profile 800 shows separate profiles for a first user 805 and a second user 810. As previously discussed, the first user 805 and second user 810 may be in the same group, such as a permission group. Inclusion of users in the same group may have implications for authentication and/or content access permissions.

The profile for the first user 805 may correlate a location with one or more automated actions or an automated action with one or more location. The automated actions may relate to access to content and/or home automation. For example, when the first user 805 is in the living room, the set-top box (or television) may switch to a default channel, such as the user's favorite channel. This channel may be identified in the user's profile, for example. Content may also be pushed to the first user's mobile device when the user enters the living room. For example, news information, weather information, and the first user's work emails may be pushed to the first user's mobile device when the first user enters the living room. The first user may also be given full access to streaming content (e.g., via a set-top box, a computer, a television, a tablet computer, a mobile phone, etc.) when he or she is in the living room. For example, the user may be subscribed to a content subscription plan, and the user may be authorized to access all of the content under the subscription plan when the user is in the living room. As will be described in the examples below, the user might not be able to access all of the content under the subscription plan when the user is at a different location such as outside (but within 20 feet of) the home.

When the first user 805 enters his or her bedroom, the living room television (or any other device, such as lights) may be turned off. The first user 805 might also have full access to streaming content while in the bedroom. A home security system at the user's premise may also be set when the first user 805 enters the bedroom. For example, the motion detectors may be activated (or otherwise turned on) when the first user enters his or her bedroom.

When the first user 805 enters his or her deck or porch, the lights in the user's home may be automatically turned off. As will be discussed in further detail in the examples below, the user's specific location within the user's home may be determined using one or more Bluetooth devices or other protocols of short or medium range.

Automated actions may also be taken when the user is outside of the home. For example, when the first user 805 is within twenty (20) feet of the home, the first user's set-top box and television may be turned on. Furthermore, when the user is outside, but within 20 feet of the home, the first user 805 might be given limited access to streaming content. For example, the first user 805 might be given access to a subset of the streaming content that the user can access when the user is within the home or within a particular room in the home (e.g., the living room).

When the first user 805 is within one (1) mile of the home, content may be pushed to the first user 805's mobile device. Alternatively or additionally, the content may be pushed to mobile devices associated with other users in the same group as the first user 805, such as the second user 810's mobile device. The content may comprise, for example, an advertisement, a message indicating that the first user 805 is within 1 mile of the home, or any other content. The first user 805 may also be given limited access to streaming content when the first user 805 is within 1 mile of the home.

When the first user 805 is within ten (10) miles of the home, the temperature at the home may be adjusted via a thermostat in the home. For example, the temperature may be increased (e.g., by turning on the heating system or turning off the air conditioning system) or decreased (e.g., by turning on the air conditioning system or turning off the heating system), based on the user's preferences stored in the profile.

When the first user 805 is at another location, such as a store, the computing device may permit a third party to send content, such as advertisements, coupons, and other content, to the first user's mobile device. For example, a coupon for a product or service may be sent to the user when he or she enters the store.

The second user 810 may also have a profile correlating locations with actions (e.g., content actions and/or home automation actions). If the second user 810 is in the living room, the set-top box and the display device (e.g., a television) in the living room may be turned on, a custom interface for the second user 810 may be pushed to or displayed on the remote control for the set-top box or television, and a content recommendation for the second user 810 may be generated and/or displayed on the television or display device in the living room or on the user's mobile device. Content recommendation will be described in further detail in the examples below.

If the second user 810 is in the bedroom, the display device in the bedroom may be turned on and a home security system, such as the motion detectors outside of the bedroom, may be turned on. If the user is outside (on the deck or porch), the lights in the home can be turned off, which is the same action that would be performed if the first user 805 goes to the deck.

When the second user 810 is within 20 feet of the home, a set-top box in the home may be turned off, a television in the living room may be turned off, and the home security system may be set. Alternatively, the home security system at the home may be turned off if the second user 810 is returning home from a different location, such as work. The doors to the home may also be locked or unlocked. Similarly, the garage door may be opened if the second user 810 is arriving home or closed if the second user 810 is leaving home.

When the second user 810 is within a mile from the home, the temperature in the home may be adjusted (for example, turned down). Furthermore, users in the same group as the second user 810 may be permitted to access a particular set of content when the second user 810 is within a mile from the home. For example, group members may be able to access an entire set of content when the second user 810 is within 20 feet of the home or inside the home, but group members might only be able to access a subset of the entire set of content when the second user 810 is between 20 feet and 1 mile from the home. When the second user 810 is within 10 miles from the home, the home temperature may be adjusted (for example, turned up). Like the first user 805, the second user 810 may be sent content, such as advertisements, by third parties when the second user 810 is at another location, such as a store.

The following table illustrates other non-limiting examples of actions that may be taken based on the user's location:

| Location | Action |
|---|---|
| User leaves home (e.g., mobile phone disconnects from home Wi-Fi network) | Send instruction to gateway device (or other network device) to make the user's home network visible in the Cloud, allowing the user to access content on the home network (e.g., documents, movies, music, etc.) and/or save, on the home network, pictures or movies taken from user's mobile phone |
| User leaves home (e.g., mobile phone disconnects from home Wi-Fi network) | Send instruction to update user's call forwarding preferences to forward calls made to home telephone(s) to user's cell phone; send instruction to disable caller ID on STB |
| User enters home (e.g., mobile phone connects to home Wi-Fi network) | Send instruction to update user's call forwarding preferences to disable call forwarding; send instruction to enable caller ID on STB |
| User is in front of display device (e.g., in living room) | Send instruction to gateway or STB to generate and/or display personalized content recommendation for user based on content marked as favorites, recently watched content, accessibility settings, and/or other factors |
| User is in car (detected by Bluetooth device in car, cellular triangulation and/or GPS) and car sensor previously or currently indicates that service on the car is recommended (e.g., oil change, check engine light, etc.) | When user is in car and within a predetermined distance from a mechanic, such as a car dealership, send message to user's mobile device or display in car to display identification of and/or directions to mechanic within predetermined distance from car's current location (e.g., within 5 miles) |
| User was previously at a retail location or other store and is currently at home | Send instruction to a home gateway, STB, or display device to display an advertisement for a product or service of the store that user visited (e.g., a J.CREW coupon or advertisement) |
| User is outside of home (e.g., at a bar) and current time is late (e.g., past midnight) | Retrieve contact information for transportation service, such as taxi company or UBER, and contact the transportation service to pick user up at bar; or push contact information for transportation service to user's mobile device |
| User previously watched a cooking show on TV with a particular theme (e.g., type of cuisine, such as Italian, or type of dish, such as chicken tikka masala) and is currently within predetermined distance (e.g., 5 miles) from relevant restaurant or grocery store | If user is within predetermined distance of relevant restaurant (e.g., Italian restaurant), display notification, such as directions to the restaurant or contact information for the restaurant; if user is within predetermined distance of grocery store, retrieve list of ingredients for relevant dish (e.g., chicken tikka masala) from website or other network location and display on user's device |
| User is more than 60 miles from home and temperature in home area/neighborhood is below freezing (based on weather information retrieved from network location, such as weather website) | Send instruction to thermostat in home or other smart home device to turn temperature in home up to a predetermined temperature (e.g., 68 degrees) |

| Location | Action |
| --- | --- |
| A preferred sports team is playing or a favorite television show or movie is airing (e.g., stored in user's content preferences), and user is outside the home | Send instruction for content recording device, such as DVR, to record the program and/or send an alert to user's mobile device that favorite program has started or is about to start (e.g., 5 minutes before start time) |
| User is currently at a sponsored location (e.g., user's mobile phone connects to a Wi-Fi hot spot associated with entity providing location services described herein) | Identify predetermined businesses or dynamically determine businesses within predetermined distance from sponsored location, and send recommendations or discounts for those businesses for display on user's mobile device |
| Member of primary user's group (e.g., a family member) lands at airport (e.g., based on detecting that cell phone has reconnected to cell tower) | Retrieve flight and airport information from the web and send instruction to primary user's mobile device and/or gateway device in primary user's home, such as STB, to display the retrieved information along with notifying the primary user of the secondary user's landing |
| Parents are not at home (or not in living room) | Make some channels on STB temporarily unavailable, such as all channels above a certain rating (R, PG-13, etc.) |
| Child has left the home | Send text message to a parent's mobile phone and/or send instruction for STB or other display device in home to display notification of the child leaving home |
| Indication of severe weather (e.g., from TV, website, alert pushed to user's device, etc.) and user (e.g., parent or child) or multiple users (e.g., parent and child) are home | Generate coupon for content purchases, such as VOD purchases, and send coupon for display on user's mobile device or home STB/display device to weather the storm |
| Teenage family member drives over the speed limit, which may be detected based on teenager's location, speed, and speed limit at the location (speed limit may be pulled from an online database) | Send notification to STB/display device or parent's mobile device that teenager has driven over the speed limit |

Returning to FIG. 5, in step 540, the computing device may store the user's profile correlating locations with actions (among other information) in, for example, the awareness database 424 illustrated in FIG. 4. As one of ordinary skill in the art would appreciate, profiles may be stored at any location, including within the user's home and/or outside of the user's home.

Figure 9:
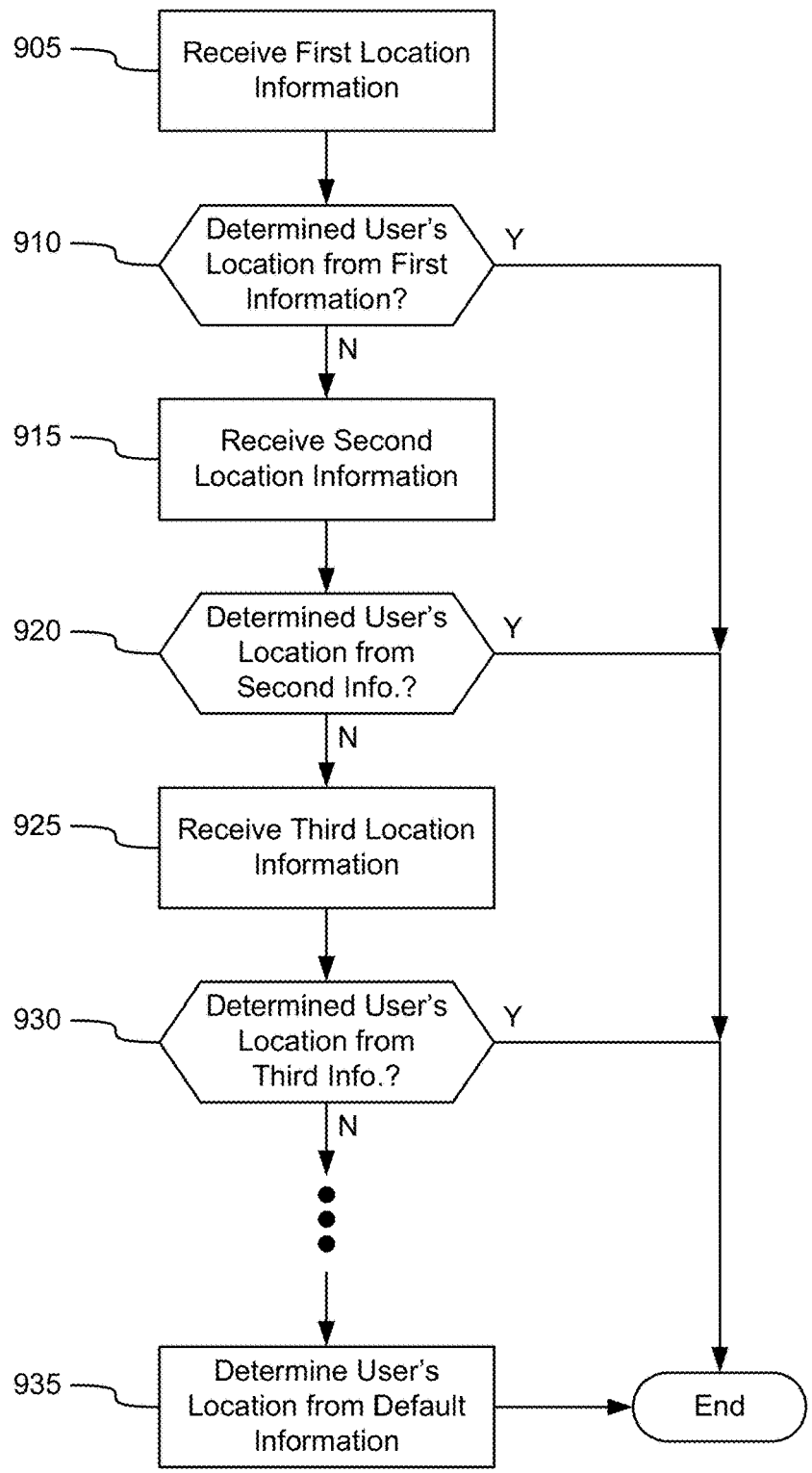
FIG. 9 illustrates an example method of determining a user's location according to one or more illustrative aspects of the disclosure.

FIG. 9 illustrates an example method of determining a user's location according to one or more illustrative aspects of the disclosure. In some aspects, the user's location may be determined in a sequential (e.g., hierarchical) manner. As will be discussed in the examples below, a computing device may attempt to determine the user's location using first information, such as Bluetooth location information. If the user's location cannot be determined using the first information, the computing device may attempt to determine the user's location using second information, such as Wi-Fi location information. If the user's location cannot be determined using the first or second information, the computing device may attempt to determine the user's location using third information, such as GPS or cellular network location information. The computing device may sequentially use each type of information until the user's location is determined. Alternatively, the computing device may use a combination of the information (e.g., first information and third information) to determine the user's location. The method may be performed by any of the computing devices described herein, including cloud computing devices, computing devices at the local office 103, computing devices within the location 102, and/or mobile computing devices (e.g., a mobile phone).

In step 905, the computing device may receive first location information. The first location information may be retrieved from a storage device, such as the awareness database 424, if it was previously received and stored or directly from a mobile device 402 or a fixed device 406 if the real-time information is in. The first location information may comprise location information with the best sensitivity. For example, the first location information may come from a short-range wireless protocol, such as Bluetooth. Any version of Bluetooth may be used. Examples include all versions of Bluetooth, including but not limited to Classic Bluetooth, Bluetooth high speed, and Bluetooth Low Energy (BLE). Other examples of short-range wireless protocols that may be used include, for example, ZigBee, infrared (e.g., IrDA), Z-Wave, audio watermarking, Wi-Fi Direct, etc.

Bluetooth may be used in a variety of advantageous ways according to the methods presented herein. For example, many mobile devices have the capability to listen for Bluetooth signal requests, and many consumer electronic devices come equipped with Bluetooth connectivity and the ability to determine signal strength of devices broadcasting Bluetooth. The Bluetooth protocol also is able to broadcast device information with its signals.

The first location information can come from any device capable of sending and/or receiving short-range messages. For example, the information can be received from a gateway (e.g., a set-top box) having Bluetooth capabilities. When the gateway detects a Bluetooth signal received from a user's mobile device, the gateway may send the information (as first location information) to, for example, the awareness server 704. The information may identify the user's mobile device and/or the gateway. Additionally or alternatively, when the user's mobile device detects a Bluetooth signal received from a Bluetooth-capable device (e.g., the gateway, Bluetooth-connected speakers, etc.), the user's mobile device may send the information (as first location information) to the awareness server 704. The information may identify the Bluetooth device and/or the user's mobile device.

In step 910, the computing device may determine whether the user's location can be determined from the first (e.g., Bluetooth) location information. For example, the computing device may compare the Bluetooth location information (which may identify the user's mobile device and/or the other Bluetooth-compatible device) with information included in the awareness database 424 (e.g., a home topology). Based on the identity of the user's mobile device (e.g., account number, email, telephone number, MAC address, IP address, etc.), the computing device may determine which user profile to check. For example, the computing device may determine that the mobile device belongs to the first user 805. Based on the identity of the Bluetooth-compatible device (e.g., IP address, MAC address, device name, device number, etc.), the computing device may determine, from the first user 805's profile, where the first user 805 is currently located, based on a previously stored topology of the home. For example and with reference to FIG. 7, if the Bluetooth-compatible device is the Bluetooth device 720, the computing device may determine that the first user 805 is currently located in the living room 708.

In some aspects, the computing device, in step 905, may receive location information from more than one device, such as a first Bluetooth device 720 located in living room 708 and a second Bluetooth device 722 located in the kitchen 710. In these circumstances, the computing device may have to decide whether the user is in the living room or kitchen. This determination may be made by comparing the Bluetooth signal strength between the mobile device 750 and the first Bluetooth device 720 to the Bluetooth signal strength between the mobile device 750 and the second Bluetooth device 720. Signal strength can be read from exchanged Bluetooth messages (e.g., from the Bluetooth stack of sent or received messages), such as during Bluetooth device pairing or other binding.

More generally, the computing device may determine a first signal strength of a first wireless transmission between a user device (e.g., the mobile device 750) and a first device (e.g., the Bluetooth device 720). The computing device may also determine a second signal strength of a second wireless transmission between the user device (e.g., the mobile device 750) and a second device (e.g., the Bluetooth device 722). The user's (or the mobile device 750's) location may be determined based on the first signal strength and the second signal strength. For example, the computing device may determine that the first signal strength is greater than the second signal strength. In response to a determination that the first signal strength is greater than the second signal strength, the computing device may determine that the location of the user device is a first room within the premises 702 (e.g., the living room 708) rather than a second room in the premises 702 (e.g., the kitchen 710), despite receiving Bluetooth information from two different devices.

If the location of the user device cannot be determined using the first (e.g., Bluetooth) location information, the computing device may determine that the user associated with the user device is not home. This may be the case if the only Bluetooth-capable devices used to determine the user's location and registered with the awareness server are located within the user's home. If, on the other hand, a Bluetooth-capable location tracking device is located outside of the home (e.g., in the user's car), the computing device may determine that the user is not at any of the locations having the Bluetooth-capable devices (e.g., the user is not home and not in the user's car). Furthermore, if the user's location cannot be determined using the first location information, the computing device may try a different method. For example, the computing device may attempt to determine the location of the user device using a second wireless protocol, as will be discussed next.

In step 915, the computing device may receive second location information. The second location information may comprise location information with a lower sensitivity than the first location information (e.g., a medium sensitivity). For example, the location information may come from a medium-range wireless protocol, such as Wi-Fi. Any of the IEEE 802.11 Wi-Fi standards may be used to determine the user's location. Other examples of medium-range wireless protocols (e.g., home wireless networks) that may be used include, for example, IEEE 802.16 WiMAX.

In step 920, the computing device may determine whether the user's location can be determined from the second location information. In some aspects, connection to a Wi-Fi network may be used to determine whether the user is within a certain distance from the user's premise. For example, in response to a determination that the location of the user device using a Wi-Fi network at a premises of the user (e.g., that the user is connected to the home Wi-Fi network), the computing device may determine that the user device is within a predetermined distance from the premises (e.g., the range of the Wi-Fi network). If the home has more than one medium-range network, each network may be used to determine the user's distance from the home. For example, the home may have a Wi-Fi network and a WiMAX network. When the user device connects to (or is able to see) the WiMAX network, the computing device may determine that the user is within a first predetermined distance (e.g., radius) from the home (e.g., 10 miles, as used as a trigger in FIG. 8). When the user device connects to (or is able to see) the Wi-Fi network, the computing device may determine that the user is within a second predetermined distance (e.g., radius) from the home (e.g., 20 feet, as used as a trigger in FIG. 8). These distances may vary based on the range of each network. The medium-range wireless networks are not limited to home networks and can include, for example, a Wi-Fi network at a third party location, such as a coffee shop or department store. The Wi-Fi network at the coffee shop may also be associated with the provider of the location services, streamlining location determination. In some aspects, the computing device may alternatively use both the first location information (e.g., Bluetooth information) and the second location information (e.g., Wi-Fi information) in combination to determine the user's location.

If the location of the user device cannot be determined using the second (e.g., Wi-Fi) location information, the computing device may determine that the user associated with the user device is not home or within a predetermined distance from the home. Furthermore, if the user's location cannot be determined using the second location information, the computing device may try a different method. For example, the computing device may attempt to determine the location of the user device using a third wireless protocol, as will be described next.

In step 925, the computing device may receive third location information. The third location information may comprise location information with a lower sensitivity than the first location information and the second location information (e.g., low sensitivity). In some aspects, the third location information may be used to track the user's location anywhere around the world. For example, the location information may come from a long-range wireless protocol, such as global positioning system (GPS) or a cellular network. Additionally or alternatively, community-based Wi-Fi (e.g., Wi-Fi available across a Wide Area Network) may be used. For example, STBs across the country may be configured to broadcast public Wi-Fi beacons. User devices outside the home may receive these broadcasts, which may be used to determine the user's location (i.e., relative to the Wi-Fi beacon received).

In step 930, the computing device may determine whether the user's location can be determined from the third location information. The user's location may be triangulated based on cellular towers (e.g., the cellular towers 726). Alternatively, the user's location may be determined using GPS. The third location information used may depend on the user device's capabilities. For example, GPS information may be used if the user's device has GPS capabilities. Cellular information may be used if the user's device has cellular capabilities. A combination of GPS and cellular information may be used if the user's device has both cellular and GPS capabilities. In some aspects, the computing device may use one or more of the first location information (e.g., Bluetooth information), the second location information (e.g., Wi-Fi information), and the third location information (e.g., GPS or cellular) in combination to determine the user's location.

If the user's location cannot be determined from first, second, or third location information, the computing device may consult other sources of information (e.g., fourth location information, fifth location information, etc.). If the computing device cannot determine the user's location from any of these sources of information, the computing device, in step 935, may determine the user's location from default information. The default information may be the user's last known location. For example, the computing device may periodically store the user's location (e.g., every 2 minutes, every 30 minutes, every hour, etc.). Default information may also be manually provided by the user. The computing device may send an instruction to the user's mobile device prompting the user to provide his or her location. When the user inputs his or her location, the mobile device may send the information to the computing device. Default information may also be the user's historical location trends. For example, if the user is at work Monday through Friday at 2 PM, and the current time is 2 PM (or close to 2 PM) on a Monday, the computing device may determine that the user is currently at work. Similarly, if the user is at home Monday through Wednesday at 9 PM, and the current time is 9 PM (or close to 9 PM) on a Wednesday, the computing device may determine that the user is currently at home.

Figure 10:
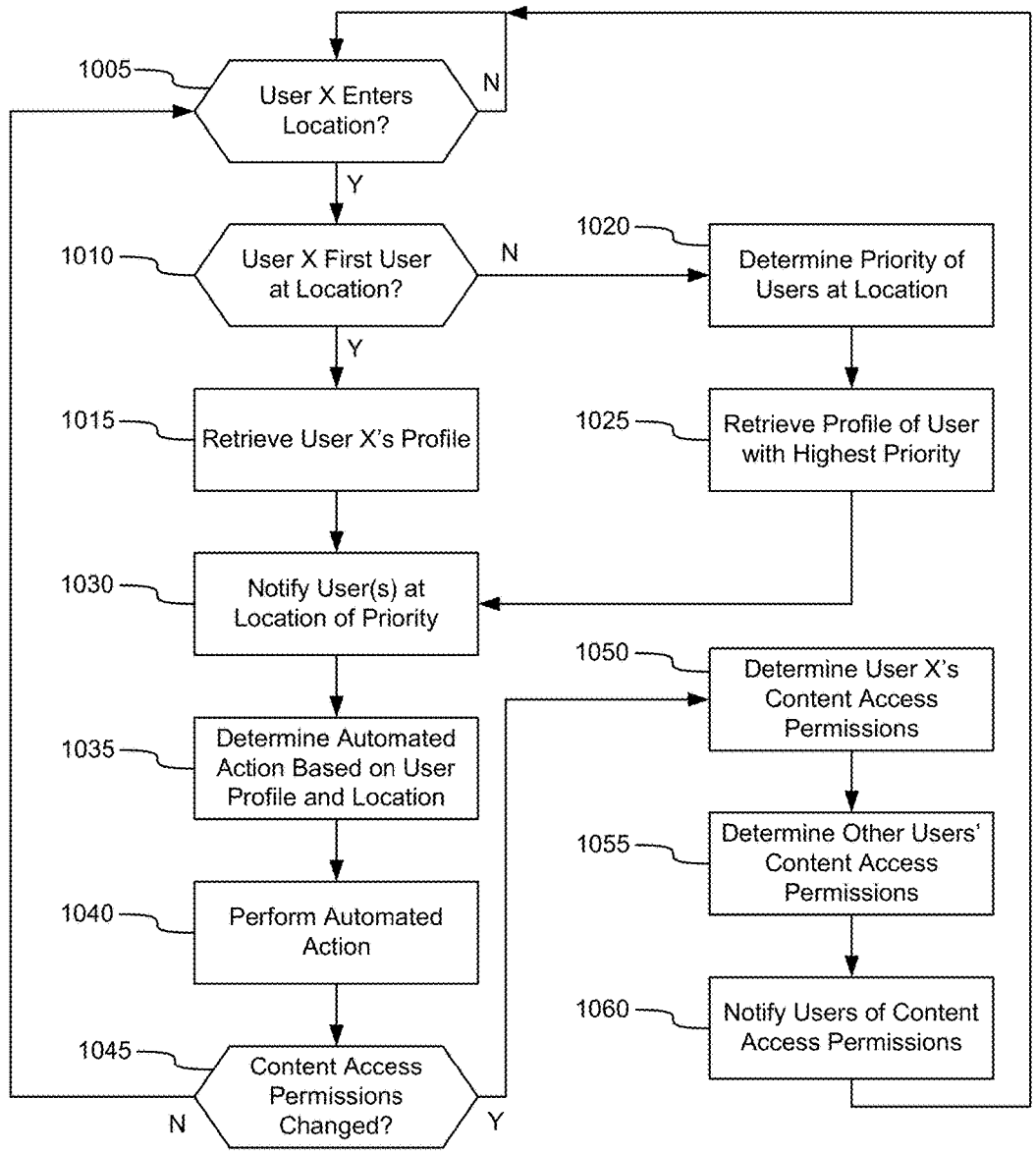
FIG. 10 illustrates an example method of performing automated actions based on a user's location according to one or more illustrative aspects of the disclosure.

FIG. 10 illustrates an example method of performing automated actions based on a user's location according to one or more illustrative aspects of the disclosure. The method may be performed by any of the computing devices described herein, including cloud computing devices, computing devices at the local office 103, computing devices within the location 102, and/or mobile computing devices (e.g., a mobile phone).

In step 1005, the computing device may determine whether the user has entered a new location. The computing device may determine that the user has entered the new location by comparing the user's current location with a previous location, such as the user's most recent previous location. If the current and previous locations are different, the computing device may determine that the user has entered a new location. If the current and previous locations match, the computing device may determine that the user has not entered a new location. If the user has not entered a new location, the computing device may wait until the user enters a new location to act. The new location may be based on one or more regions, as previously discussed. For example, each new location may correspond to a different room in the user's home. Additionally or alternatively, each new location may correspond to inside or outside of the user's home. Additionally or alternatively, each new location may correspond to a predetermined distance from the user's home (e.g., 10 feet, 1 mile, 10 miles, etc.). Any level of granularity may be used to determine when the user has entered a new location.

In step 1010, after the user enters a new location, the computing device may determine whether the user is the first user at the location. For example, the computing device may determine whether other members of the user's group(s) (e.g., determined in step 530) are at the same location. The computing device may keep track of the number of users and identity of each user at the location. As previously discussed, the users' identities may correspond to, for example, their email addresses, account numbers, telephone numbers, device identifiers, etc.

In step 1015, the computing device may retrieve the user's profile, for example, if the user is the first user at the location. As previously discussed, the user's profile may have been stored in the awareness database 424 in step 540. On the other hand, if the user is not the first user at the location, the computing device, in step 1020, may determine the priority of the users currently at the location. This priority information may be stored in, for example, the awareness database 424. Users' priorities may be relative to the group to which the users belong. For example, the primary user (e.g., a primary accountholder) may have the highest (i.e., first) priority and all of the other, secondary users may have lower priorities. The priorities of the secondary users may also be predefined and stored in the awareness database 424. In some aspects, the first user at the location may have the highest priority, and subsequent users may be added to the priority queue. If the first user leaves the location, the second user at the location might be given the highest priority. If the second user leaves, the third user at the location might be given the highest priority, and so on. In step 1025, the computing device may retrieve the profile of the user having the highest priority of all of the users at the location.

In step 1030, the computing device may notify user(s) at the location of their respective priorities. The computing device may send a message (or instruct a message to be sent) to each user's mobile device at the location. The message to the primary user in the living room may state, for example, "You have the highest priority in the living room." The message to the other users in the living room may indicate, for example, that the user does not have the highest priority in the living room, the priority number of that user, and/or an indication of the primary user (with the highest priority). Instead of or in addition to sending messages to each user's device, the computing device may send a message (or instruct a message to be sent) for a display device, such as a television or an associated gateway device, to display a message that all of the user's might be able to see. For example, the set-top box in the living room may be instructed to display the message "[Name of Primary User] has the highest priority in the Living Room."

In step 1035, the computing device may determine one or more automated actions to perform based on the user's profile (e.g., the first user's profile 805) and the user's location. As previously discussed, the profile may correlate each location with one or more automated action, including content-based actions and home automation-based actions. Examples of automated actions (turning on/off devices, turning on/off security system, recommending content) were previously described with reference to FIG. 8. The computing device can send an instruction (or cause an instruction to be sent) to one or more devices to perform the action. For example, an instruction may be sent to turn on the STB, to turn on the television, or to generate a content recommendation. An instruction may also be sent to the user's mobile device to, for example, display a content recommendation or display a customized remote control user interface.

The content recommendations may be based on the users at the location. If only one user is at the location, a recommendation based only on that user's preferences may be generated. For example, the user's profile may indicate that the user likes action movies, and appropriate content recommendations may be generated. If two users are at the location, a hybrid recommendation based on both users' preferences may be generated. For example, the second user's profile may indicate that the second user likes romantic comedy television shows. Content recommendations including action movies and romantic comedy television shows may be generated and displayed to all of the users at the location (e.g., on the television) or to each user individually (e.g., on each user's mobile device).

Furthermore, each combination of users at the location may result in a different type of recommendation. To illustrate, assume that the permission group includes a husband, a wife, their teenage daughter, and their four-year-old son. If the husband and the wife are in the living room (with the television), romantic content may be recommended. If the husband, wife, and teenage daughter are in the living room, documentaries or news content may be recommended. If the husband, wife, and four-year-old son are in the living room, family movie recommendations may be made. If the teenage daughter is in the living room, music video or reality television show content recommendations may be made. More generally, if user A and user B are at the location, a recommendation M may be made. If user A and user C are at the location, a recommendation N may be made. If user B and user C are at the location, a recommendation O may be made. If users A, B, and C are at the location, a recommendation P may be made.

In step 1040, the computing device may perform the one or more selected automated actions (or send an instruction to another device to perform the automated actions). For example, if the action comprises generating a content recommendation for the user associated with the user device, an instruction can be sent to a display device or STB in the home to generate a content recommendation, as previously discussed. As another example, an instruction can be sent to a gateway device at the premise in response to a determination that the user device is within the predetermined distance (e.g., 20 feet, 1 mile, 10 miles, etc.) from the premise.

In step 1045, the computing device may determine whether content access permissions have changed for any of the users at the location or any other users, such as other users in the user's group that are not currently at the location. If not, the method may proceed to step 1005 to wait for another device to enter the location.

In step 1050, if content access permissions have changed due to the user entering the location, the computing device may determine the user's content access permissions. As previously discussed, the user's content access permissions may depend on the user's location. For example, the user may be permitted to access a first group of content items at a first location (e.g., within the home or within a particular room in the home) and a second group of content items different from the first group at a second location (e.g., outside of the home). In some aspects, the second group of content items may be a subset of the first group of content items, such that the user is permitted to access more content when the user is in the home than when the user is outside the home. The second group of content items need not be a subset of the first group and may instead be a different group of content items (with or without overlap) with the first group of content items.

In step 1055, the computing device may determine other users' (e.g., users in the user's group) content access permissions. For example, the computing device may permit users in the same group as the user at the location to access the same content as the user can access. In other words, the computing device may permit a plurality of other devices to access the group of content item in response to permitting the user at the location to access the group of content items (based on the location of the device). In some aspects, the other users (or devices) may be at the same location in order to access the same content. For example, users might not be able to access the same content if they are not at the same location. Alternatively, the other users/devices might not need to be at the same location as the user at the location in order to access the same group of content items.

In some aspects, the amount of content that can be accessed may depend on the number of users in the group that are at a particular location, such as a living room in the home. For example, assume that a first device associated with a first user is at a particular location and that the first user is the only user at that location. The first user may be permitted to access a first group of content items. In response to a determination that a second device in the same permission group as the first device is also at that location, the computing device may permit the first user of the first device and the second user of the second device to access the first group of content items and a second group of content items. Furthermore, in response to a determination that a third device in the same permission group as the first and second devices is at the same location as the first and second devices, the computing device may permit the first user of the first device, the second user of the second device, and the third user of the third device to access the first group of content items, the second group of content items, and the third group of content items. Therefore, users can be encouraged to meet at particular locations by permitting them to access more content the more users there are at the location.

In step 1060, the computing device may notify users of their new content access permissions (if they have changed). For example, a message notifying each of the devices of content restrictions may be sent to each respective device.

Figure 11:
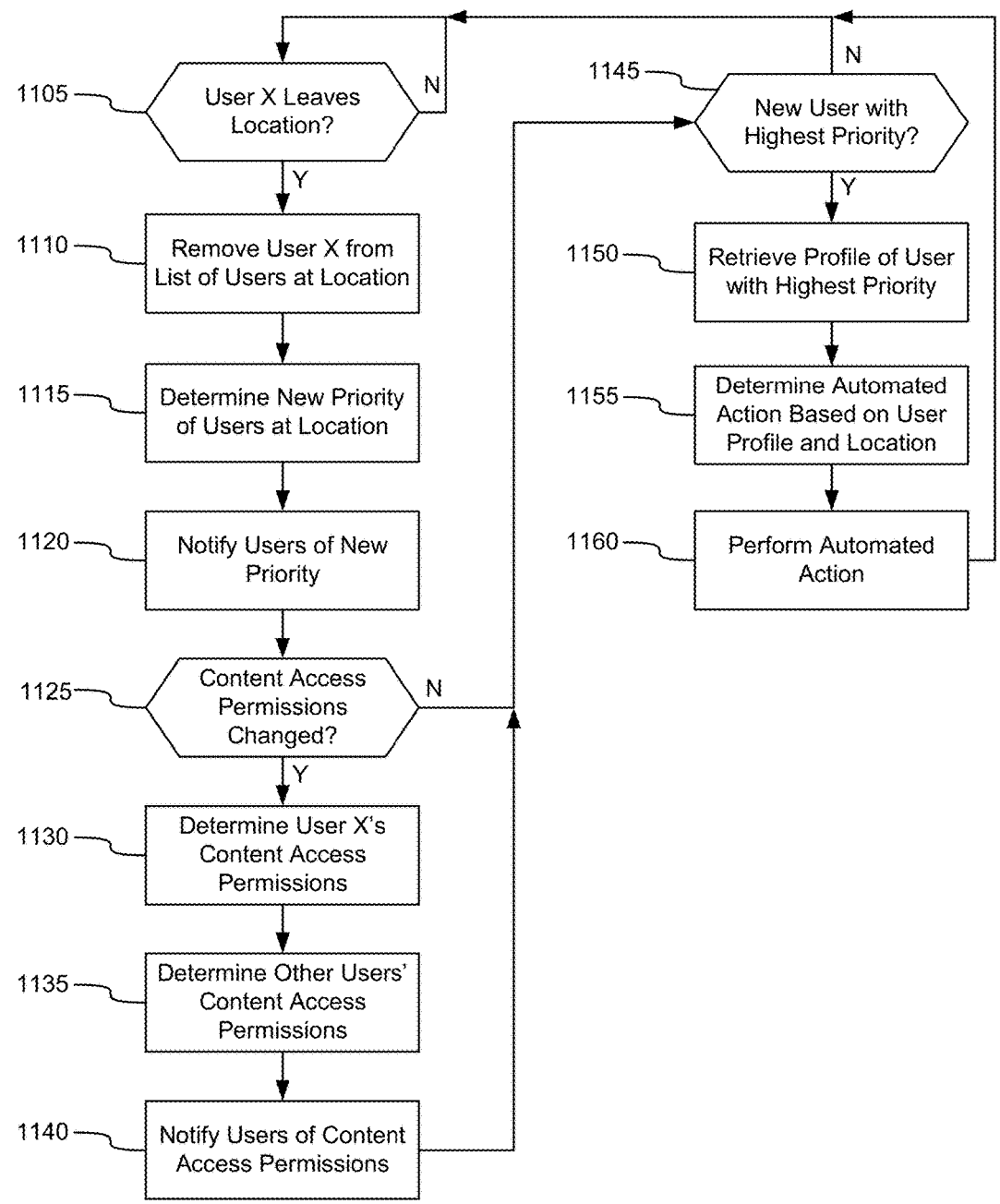
FIG. 11 illustrates another example method of performing automated actions based on a user's location according to one or more illustrative aspects of the disclosure.

FIG. 11 illustrates another example method of performing automated actions based on a user's location according to one or more illustrative aspects of the disclosure. The method may be performed by any of the computing devices described herein, including cloud computing devices, computing devices at the local office 103, computing devices within the location 102, and/or mobile computing devices (e.g., a mobile phone).

In step 1105, the computing device may determine whether the user has left a location. Similar to determining whether a user has entered a location (e.g., step 1005), short-range wireless location information, medium-range wireless location information, and long-range wireless location information may be sequentially used or used in combination to and current location determine the location of each user. Furthermore, the user's previous location can be used to determine whether the user left the previous location.

In step 1110, the computing device may remove the user from a list of users at the location when the user has left the location. By doing this, the computing device may keep track of which users are at which locations. In step 1115, the computing device may determine new priority information for users still at the location. This step may be similar to step 1020 previously discussed. For example, if the highest priority user left the location, each of the remaining users can be shifted up one position, such that the second priority user becomes the first priority user, the third priority user becomes the second priority user, etc. If the second priority user left the location, the first priority user may remain the first priority user, but the third priority user may be shifted to the second spot vacated by the user that left.

In step 1120, the computing device may notify user(s) at the location of their respective priorities. This step may be similar to step 1030 previously discussed.

In step 1125, the computing device may determine whether content access permissions have changed for any of the users at the location or any other users, such as other users in the leaving user's group that are not currently at the location. This step may be similar to step 1045 previously discussed. If content access permissions have changed, the computing device may determine the leaving user's content access permissions in step 1130 and determine the other users' (e.g., users in the user's group) content access permissions in step 1135.

Several examples of steps 1125, 1130, and 1135 will now be provided. In one example, the computing device may prevent a plurality of other devices from accessing a group of content items in response to a determination that a device in the group is no longer at the location. If all users in the same group are permitted to access a group of content items while one of the users is at a particular location, such as the living room, and the only user at the living room leaves the living room, the users in that group might not be permitted to access the group of content items after the user leaves the living room. As another example, assume that the number of content items that users in a group can access depends on the number of users at the location, as previously discussed. If one of the users in the group leaves the location, the computing device may determine that content access permissions have changed (e.g., the remaining users at the location may access a small number of content items).

In step 1140, the computing device may notify users of their new content access permissions. This step may be similar to step 1060 previously discussed.

In step 1145, the computing device may determine whether there is a new user with highest priority at the location that the leaving user left. If not, the method may return to step 1105 to determine whether another user has left the location. If there is a new user with highest priority (e.g., the leaving user previously had the highest priority), the computing device may retrieve the profile of the user having the highest priority of all of the users at the location in step 1150. Retrieval of the user's profile was previously discussed with respect to steps 1015 and 1025.

In step 1155, the computing device may determine one or more automated actions to perform based on the highest priority user's profile and location. As previously discussed, the profile may correlate each location with one or more automated action, including content-based actions and home automation-based actions. Step 1155 may be similar to step 1035 previously discussed.

In step 1160, the computing device may perform the one or more selected automated actions (or send an instruction to another device to perform the automated actions). This step may be similar to step 1040 previously discussed. Alternatively, the computing device may query the user having the highest priority to determine whether that user wants to perform the automated actions now or later. For example, the STB may be tuned to channel 5. The user with the highest priority may prefer to remain on channel 5 now, rather than the STB automatically switching to that user's default channel. The highest priority user may also set a time in the future for the computing device to perform automated actions for the user.

In some aspects, the computing device may track the amount of time that a user has been at a particular location. For example, the primary user may be a father, and one of the secondary users may be his son. The father may set up his profile to keep track of the amount of time his son has spent at a particular location, such as the living room in front of the television or a gaming console. The father may be periodically notified of the amount of time his son spends in front of the TV or notified when the son spends more than a predetermined amount of time in front of the TV (e.g., more than 4 hours).

The various features described above are merely non-limiting examples, and can be rearranged, combined, subdivided, omitted, and/or altered in any desired manner. For example, features of the computing device (including the remote control device and the terminal device) described herein can be subdivided among multiple processors and computing devices. The true scope of this patent should only be defined by the claims that follow.

I claim:

1. A method comprising:
storing, by a computing device, information associating each range, of a plurality of ranges, with a corresponding group of one or more groups of streaming content items, wherein each range is determined based on communication via a wireless protocol of a plurality of wireless protocols;
determining, based on communication via at least one of the plurality of wireless protocols, that a location of a first mobile device is within a first range of the plurality of ranges, associated with a premises; and
granting, based on the location of the first mobile device within the first range of the plurality of ranges, the first mobile device access to a first group of streaming content items of the one or more groups of streaming content items.

2. The method of claim 1, wherein the location of the first mobile device is within the premises, and wherein the method further comprises:
sending, by the computing device and to a content output device within the premises, an instruction to switch to a default channel based on a first user profile associated with the first mobile device.

3. The method of claim 2, further comprising:
determining, by the computing device, that the first mobile device is unreachable via a first wireless protocol of the plurality of wireless protocols;
determining, by the computing device, that the first mobile device has moved away from the premises; and
sending, by the computing device and to the content output device, a deactivation instruction.

4. The method of claim 1, wherein the first range, of the plurality of ranges, is determined by communication via BLUETOOTH, wherein a second range, of the plurality of ranges, is determined by communication via Wi-Fi, wherein a third range, of the plurality of ranges, is determined by communication via at least one of a Global Positioning System (GPS) protocol or a cellular protocol, and wherein the method further comprises:
granting a content output device, located within the first range, access to the first group of streaming content items.

5. A method comprising:
determining, by a computing device and based on a first wireless network, that a first mobile device is located within a premises;
granting, by the computing device, a content output device, located within the premises, access to a first group of streaming content items of one or more groups of streaming content items, wherein each group, of the one or more of groups of streaming content items, is associated with a threshold distance of a plurality of threshold distances associated with the premises;
after determining that the first mobile device is not in communication with the computing device via the first wireless network, attempting to communicate with the first mobile device via a second wireless network;
after communicating with the first mobile device via the second wireless network, determining that the first mobile device is located within a first threshold distance, of the plurality of threshold distances, associated with the premises; and after the determining that the first mobile device is located within the first threshold distance:

revoking, by the computing device and for the content output device, access to first one or more streaming content items of the first group of streaming content items; and granting the first mobile device access to second one or more streaming content items of the first group of streaming content items via the second wireless network.

6. The method of claim 5, further comprising:

after determining that the first mobile device is not in communication with the computing device via the first wireless network and is not in communication via the second wireless network, attempting to communicate with the first mobile device via a third wireless network;

after communicating with the first mobile device via the third wireless network, determining that the first mobile device is located within a second threshold distance of the plurality of threshold distances associated with the premises, wherein the second threshold distance is greater than the first threshold distance; and preventing the first mobile device from accessing the second one or more streaming content items of the first group of streaming content items via the third wireless network.

7. The method of claim 5, further comprising:

after determining that a second mobile device, in a same permission group as the first mobile device, is also within the first threshold distance, granting the first mobile device and the second mobile device access to the first group of streaming content items and a second group of the one or more groups of streaming content items, wherein the second group of streaming content items is based on a user profile associated with the second mobile device.

8. The method of claim 7, further comprising:

after determining that a third mobile device, in the same permission group as the first mobile device and the second mobile device, is also within the first threshold distance, granting the first mobile device, the second mobile device, and the third mobile device access to the first group of streaming content items, the second group of streaming content items, and a third group of the one or more groups of streaming content items, wherein the third group of streaming content items of the one or more groups of streaming content items is based on a user profile associated with the third mobile device.

9. The method of claim 5, further comprising:

granting the first mobile device access to the first group of streaming content items based on the first mobile device being located within the premises.

10. The method of claim 2, further comprising:

granting, by the computing device and based on the first user profile, the first mobile device priority, over other mobile devices within the premises, to control the content output device.

11. The method of claim 2, further comprising:

determining, by the computing device, that a second mobile device is in communication with the content output device; and determining, based on a second user profile associated with the second mobile device, that the second mobile device is to receive priority for controlling the content output device.

12. The method of claim 2, further comprising:

generating a hybrid content recommendation displayable by the content output device and based on the first user profile associated with the first mobile device and a second user profile associated with a second mobile device that is also at the location of the first mobile device within the premises.

13. The method of claim 1, further comprising:

determining, based on the at least one of the plurality of wireless protocols, that one or more other mobile devices are also within the first range of the plurality of ranges; and granting the one or more other mobile devices access to the first group of streaming content items.

14. The method of claim 13, further comprising: determining, based on the at least one of the plurality of wireless protocols, that the first mobile device has left the first range of the plurality of ranges and entered a second range of the plurality of ranges, wherein the second range of the plurality of ranges is greater than the first range of the plurality of ranges;

after determining that the first mobile device has entered the second range, preventing the one or more other mobile devices from accessing the first group of streaming content items, wherein the first group of streaming content items is associated with full access to streaming content; and granting the first mobile device access to a second group of the one or more groups of streaming content items, wherein the second group of streaming content items is associated with limited access to the streaming content.

15. The method of claim 1, further comprising:

determining, by the computing device, that the first mobile device is unreachable via a first wireless protocol and a second wireless protocol of the plurality of wireless protocols;

determining, by the computing device and based on a third wireless protocol of the plurality of wireless protocols, that the location of the first mobile device is within a third range of the plurality of ranges, wherein the third range of the plurality of ranges is greater than the first range of the plurality of ranges; and sending, by the computing device and to a second user device located within the first range of the plurality of ranges, an instruction to activate one or more motion detectors located within the premises.

16. The method of claim 2, further comprising:

determining, by the computing device, that the first mobile device is unreachable via a first wireless protocol and a second wireless protocol of the plurality of wireless protocols;

determining, by the computing device and based on a third wireless protocol of the plurality of wireless protocols, that the location of the first mobile device is within a third range of the plurality of ranges, wherein the third range is greater than the first range of the plurality of ranges;

sending, by the computing device and to the content output device, a power off command; and granting, by the computing device and based on the location of the first mobile device within the third range of the plurality of ranges, access to a second group of the one or more groups of streaming content items, wherein the second group of streaming content items is indicative of limited access to streaming content.

17. The method of claim 5, further comprising:
determining that a second mobile device is located within the premises;
generating, based on a first user profile associated with the first mobile device and a second user profile associated with the second mobile device, a hybrid content recommendation displayable by the content output device; and
sending, by the computing device and to the content output device, the hybrid content recommendation.

18. A computing device comprising:
one or more processors; and
memory storing instructions that, when executed by the one or more processors, cause the computing device to:
store information associating each range, of a plurality of ranges, associated with a premises, with a corresponding group of one or more groups of streaming content items, wherein each range is determined based on communication via a wireless protocol of a plurality of wireless protocols;
determine, based on communication via at least one of the plurality of wireless protocols, that a location of a first mobile device is within a first range of the plurality of ranges that are associated with the premises; and
grant, based on the location of the first mobile device within the first range of the plurality of ranges, the first mobile device access to a first group of streaming content items of the one or more groups of streaming content items.

19. The computing device of claim 18, wherein the location of the first mobile device is within the premises, and the instructions, when executed by the one or more processors, cause the computing device to:
send, to a content output device within the premises, an instruction to switch to a default channel based on a first user profile associated with the first mobile device.

20. The computing device of claim 19, wherein the instructions, when executed by the one or more processors, cause the computing device to:
determine that the first mobile device is unreachable via a first wireless protocol of the plurality of wireless protocols;
determine that the first mobile device has moved away from the premises; and
send, to the content output device, a deactivation instruction.

21. A computing device comprising:
one or more processors; and
memory storing instructions that, when executed by the one or more processors, cause the computing device to:
determine, based on a first wireless network, that a first mobile device is located within a premises;
grant a content output device, located within the premises, access to a first group of streaming content items of one or more groups of streaming content items, wherein each group, of the one or more of groups of streaming content items, is associated with a threshold distance of a plurality of threshold distances associated with the premises;
after a determination that the first mobile device is not in communication with the computing device via the first wireless network, attempt to communicate with the first mobile device via a second wireless network;
after a communication with the first mobile device via the second wireless network, determine that the first mobile device is located within a first threshold distance, of the plurality of threshold distances, associated with the premises; and
after a determination that the first mobile device is located within the first threshold distance:
revoke, for the content output device, access to first one or more of the first group of streaming content items; and
grant the first mobile device access to second one or more of the first group of streaming content items via the second wireless network.

22. The computing device of claim 21, wherein the instructions, when executed by the one or more processors, cause the computing device to:
after a determination that the first mobile device is not in communication with the computing device via the first wireless network and is not in communication via the second wireless network, attempt to communicate with the first mobile device via a third wireless network;
after a communication with the first mobile device via the third wireless network, determine that the first mobile device is located within a second threshold distance of the plurality of threshold distances from the premises, wherein the second threshold distance is greater than the first threshold distance; and
prevent the first mobile device from accessing the second one or more of the first group of streaming content items via the third wireless network.

23. The computing device of claim 21, wherein the instructions, when executed by the one or more processors, cause the computing device to:
after a determination that a second mobile device, in a same permission group as the first mobile device, is also within the first threshold distance, grant the first mobile device and the second mobile device access to the first group of streaming content items and a second group of the one or more groups of streaming content items, wherein the second group of streaming content items is based on a user profile associated with the second mobile device.

* * * * *

UNITED STATES PATENT AND TRADEMARK OFFICE
CERTIFICATE OF CORRECTION

| | |
|---|---|
| PATENT NO. | : 10,440,499 B2 |
| APPLICATION NO. | : 14/305702 |
| DATED | : October 8, 2019 |
| INVENTOR(S) | : Corey Farrell |

It is certified that error appears in the above-identified patent and that said Letters Patent is hereby corrected as shown below:

In the Specification

Column 1, Line 40:
After "premises", insert --.--

Column 1, Line 67:
After "premises", insert --.--

In the Claims

Claim 1, Column 26, Line 18:
After "range", insert --,--

Claim 25, Column 28, Line 19:
After "comprising:", insert --¶--

Signed and Sealed this
Twenty-third Day of August, 2022

Katherine Kelly Vidal
*Director of the United States Patent and Trademark Office*